(12) United States Patent
Sarkissian et al.

(10) Patent No.: US 6,771,646 B1
(45) Date of Patent: Aug. 3, 2004

(54) ASSOCIATIVE CACHE STRUCTURE FOR LOOKUPS AND UPDATES OF FLOW RECORDS IN A NETWORK MONITOR

(75) Inventors: Haig A. Sarkissian, San Antonio, TX (US); Russell S. Dietz, San Jose, CA (US)

(73) Assignee: Hi/fn, Inc., Los Gatos, CA (US)

( * ) Notice: Subject to any disclaimer, the term of this patent is extended or adjusted under 35 U.S.C. 154(b) by 591 days.

(21) Appl. No.: 09/608,266

(22) Filed: Jun. 30, 2000

Related U.S. Application Data

(60) Provisional application No. 60/141,903, filed on Jun. 30, 1999.

(51) Int. Cl.[7] .............................................. G01R 31/08
(52) U.S. Cl. ....................... 370/392; 370/412; 370/252; 370/352; 709/223; 711/119
(58) Field of Search .............................. 370/241.1, 252, 370/253, 352, 353, 355, 389, 392, 401, 395.1; 709/223, 224

(56) References Cited

U.S. PATENT DOCUMENTS

| | | | | |
|---|---|---|---|---|
| 3,949,369 A | * | 4/1976 | Churchill, Jr. ............... | 711/128 |
| 4,458,310 A | * | 7/1984 | Chang ......................... | 711/119 |
| 4,559,618 A | * | 12/1985 | Houseman et al. ........... | 365/49 |
| 4,736,320 A | | 4/1988 | Bristol ........................ | 364/300 |
| 4,891,639 A | | 1/1990 | Nakamura ............... | 340/825.5 |
| 4,910,668 A | * | 3/1990 | Okamoto et al. ........... | 711/207 |
| 4,972,453 A | | 11/1990 | Daniel, III et al. .......... | 379/10 |
| 5,101,402 A | | 3/1992 | Chiu et al. | |
| 5,247,517 A | | 9/1993 | Ross et al. .................. | 370/85.5 |
| 5,247,693 A | | 9/1993 | Bristol ........................ | 395/800 |
| 5,315,580 A | | 5/1994 | Phaal | |
| 5,339,268 A | | 8/1994 | Machida ...................... | 365/49 |
| 5,351,243 A | | 9/1994 | Kalkunte et al. | |
| 5,365,514 A | | 11/1994 | Hershey et al. | |
| 5,375,070 A | | 12/1994 | Hershey et al. ............. | 364/550 |
| 5,394,394 A | | 2/1995 | Crowther et al. | |
| 5,414,650 A | | 5/1995 | Hekhuis ................. | 364/715.02 |
| 5,414,704 A | | 5/1995 | Spinney | |
| 5,430,709 A | | 7/1995 | Galloway | |

(List continued on next page.)

FOREIGN PATENT DOCUMENTS

JP 02003044510 A * 2/2003 ........... G06F/17/30

OTHER PUBLICATIONS

R. Periakaruppam and E. Nemeth. "GTrace–A Graphical Traceroute Tool." 1999 Usenix LISA. Available on www.caida.org, URL: http://www.caida.org/outreach/papers/1999/GTrace.pdf.
W. Stallings. "Packet Filtering in the SNMP Remote Monitor." Nov. 1994. Available on www.ddj.com, URL: http://www.ddj.com/documents/s=1013/ddj9411h/9411h.htm.
"Technical Note: the Narus System," Downloaded Apr. 29, 1999 from www.narus.com, Narus Corporation, Redwood City California.

*Primary Examiner*—Ricky Ngo
*Assistant Examiner*—Alan V. Nguyen
(74) *Attorney, Agent, or Firm*—Dov Rosenfeld; Inventek

(57) ABSTRACT

A cache system for looking up one or more elements of an external memory includes a set of cache memory elements coupled to the external memory, a set of content addressable memory cells (CAMs) containing an address and a pointer to one of the cache memory elements, and a matching circuit having an input such that the CAM asserts a match output when the input is the same as the address in the CAM cell. The cache memory element which a particular CAM points to changes over time. In the preferred implementation, the CAMs are connected in an order from top to bottom, and the bottom CAM points to the least recently used cache memory element.

20 Claims, 21 Drawing Sheets

U.S. PATENT DOCUMENTS

| | | | |
|---|---|---|---|
| 5,432,776 A | | 7/1995 | Harper |
| 5,493,689 A | | 2/1996 | Waclawsky et al. ......... 395/821 |
| 5,500,855 A | | 3/1996 | Hershey et al. |
| 5,511,215 A | | 4/1996 | Terasaka et al. ............. 395/800 |
| 5,530,834 A | * | 6/1996 | Colloff et al. ............... 711/136 |
| 5,530,958 A | * | 6/1996 | Agarwal et al. ................ 711/3 |
| 5,535,338 A | | 7/1996 | Krause et al. ............ 395/200.2 |
| 5,568,471 A | | 10/1996 | Hershey et al. |
| 5,574,875 A | | 11/1996 | Stansfield et al. ........... 395/403 |
| 5,586,266 A | | 12/1996 | Hershey et al. ......... 395/200.11 |
| 5,606,668 A | | 2/1997 | Shwed ................... 395/200.11 |
| 5,608,662 A | | 3/1997 | Large et al. ............ 364/724.01 |
| 5,634,009 A | | 5/1997 | Iddon et al. ............ 395/200.11 |
| 5,651,002 A | | 7/1997 | Van Seters et al. .......... 370/392 |
| 5,684,954 A | | 11/1997 | Kaiserswerth et al. ... 395/200.2 |
| 5,703,877 A | | 12/1997 | Nuber et al. ................. 370/395 |
| 5,720,032 A | | 2/1998 | Picazo, Jr. et al. ........ 395/200.2 |
| 5,732,213 A | | 3/1998 | Gessel et al. ........... 395/200.11 |
| 5,740,355 A | | 4/1998 | Watanabe et al. ....... 395/183.21 |
| 5,749,087 A | * | 5/1998 | Hoover et al. ............... 711/108 |
| 5,761,424 A | | 6/1998 | Adams et al. .......... 395/200.47 |
| 5,764,638 A | | 6/1998 | Ketchum .................... 370/401 |
| 5,781,735 A | | 7/1998 | Southard ............... 395/200.54 |
| 5,784,298 A | | 7/1998 | Hershey et al. .............. 364/557 |
| 5,787,253 A | | 7/1998 | McCreery et al. ...... 395/200.61 |
| 5,802,054 A | | 9/1998 | Bellenger ................... 370/401 |
| 5,805,808 A | | 9/1998 | Hasani et al. ............. 395/200.2 |
| 5,812,529 A | | 9/1998 | Czarnik et al. ............. 370/245 |
| 5,819,028 A | | 10/1998 | Manghirmalani et al. ........................ 395/185.1 |
| 5,825,774 A | | 10/1998 | Ready et al. ................ 370/401 |
| 5,835,726 A | | 11/1998 | Shwed et al. .......... 395/200.59 |
| 5,835,963 A | | 11/1998 | Yoshioka et al. ............ 711/207 |
| 5,838,919 A | | 11/1998 | Schwaller et al. ...... 395/200.54 |
| 5,841,895 A | | 11/1998 | Huffman ..................... 382/155 |
| 5,850,386 A | | 12/1998 | Anderson et al. ........... 370/241 |
| 5,850,388 A | | 12/1998 | Anderson et al. ........... 370/252 |
| 5,860,114 A | | 1/1999 | Sell ............................. 711/146 |
| 5,862,335 A | | 1/1999 | Welch, Jr. et al. ...... 395/200.54 |
| 5,878,420 A | | 3/1999 | de la Salle ................... 707/10 |
| 5,893,155 A | | 4/1999 | Cheriton ..................... 711/144 |
| 5,903,754 A | | 5/1999 | Pearson ...................... 395/680 |
| 5,917,821 A | | 6/1999 | Gobuyan et al. ........... 370/392 |
| 6,003,123 A | * | 12/1999 | Carter et al. ................. 711/207 |
| 6,014,380 A | | 1/2000 | Hendel et al. ............... 370/392 |
| 6,115,393 A | | 9/2000 | Engel et al. ................. 370/469 |
| 6,279,113 B1 | | 8/2001 | Vaidya ........................ 713/201 |
| 6,330,226 B1 | | 12/2001 | Chapman et al. ........... 370/232 |
| 6,363,056 B1 | | 3/2002 | Beigi et al. .................. 370/252 |
| 6,424,624 B1 | | 7/2002 | Galand et al. ............... 370/231 |
| 6,625,657 B1 | | 9/2003 | Bullard ........................ 709/237 |
| 6,651,099 B1 | | 11/2003 | Dietz et al. .................. 709/224 |

* cited by examiner

ASSOCIATIVE CACHE STRUCTURE FOR LOOKUPS AND UPDATES OF FLOW RECORDS IN A NETWORK MONITOR

CROSS-REFERENCE TO RELATED APPLICATION

This application claims the benefit of U.S. Provisional Patent Application Ser. No.: 60/141,903 for METHOD AND APPARATUS FOR MONITORING TRAFFIC IN A NETWORK to inventors Dietz, et al., filed Jun. 30, 1999, the contents of which are incorporated herein by reference.

This application is related to the following U.S. patents and U.S. patent applications, each filed concurrently with the present application, and each assigned to Apptitude, Inc., the assignee of the present invention:

U.S. Pat. No. 6,651,099 for METHOD AND APPARATUS FOR MONITORING TRAFFIC IN A NETWORK, to inventors Dietz, et al., and incorporated herein by reference.

U.S. Pat. No. 6,665,725 for PROCESSING PROTOCOL SPECIFIC INFORMATION IN PACKETS SPECIFIED BY A PROTOCOL DESCRIPTION LANGUAGE, to inventors Koppenhaver, et al.,-filed and incorporated herein by reference.

U.S. patent application Ser. No. 09/608,126 for RE-USING INFORMATION FROM DATA TRANSACTIONS FOR MAINTAINING STATISTICS IN NETWORK MONITORING, to inventors Dietz, et al., filed and incorporated herein by reference.

U.S. patent application Ser. No. 09/608,267 for STATE PROCESSOR FOR PATTERN MATCHING IN A NETWORK MONITOR DEVICE, to inventors Sarkissian, et al., and incorporated herein by reference.

FIELD OF INVENTION

The present invention relates to computer networks, specifically to the real-time elucidation of packets communicated within a data network, including classification according to protocol and application program.

BACKGROUND

There has long been a need for network activity monitors. This need has become especially acute, however, given the recent popularity of the Internet and other interconnected networks. In particular, there is a need for a real-time network monitor that can provide details as to the application programs being used. Such a monitor should enable non-intrusive, remote detection, characterization, analysis, and capture of all information passing through any point on the network (i.e., of all packets and packet streams passing through any location in the network). Not only should all the packets be detected and analyzed, but for each of these packets the network monitor should determine the protocol (e.g., http, ftp, H.323, VPN, etc.), the application/use within the protocol (e.g., voice, video, data, real-time data, etc.), and an end user's pattern of use within each application or the application context (e.g., options selected, service delivered, duration, time of day, data requested, etc.). Also, the network monitor should not be reliant upon server resident information such as log files. Rather, it should allow a user such as a network administrator or an Internet service provider (ISP) the means to measure and analyze network activity objectively; to customize the type of data that is collected and analyzed; to undertake real time analysis; and to receive timely notification of network problems.

Related and incorporated by reference U.S. Pat. No. 6,51,099 for METHOD AND APPARATUS FOR MONITORING TRAFFIC IN A NETWORK, to inventors Dietz, et al, describes a network monitor that includes carrying out protocol specific operations on individual packets including extracting information from header fields in the packet to use for building a signature for identifying the conversational flow of the packet and for recognizing future packets as belonging to a previously encountered flow. A parser subsystem includes a parser for recognizing different patterns in the packet that identify the protocols used. For each protocol recognized, a slicer extracts important packet elements from the packet. These form a signature (i.e., key) for the packet. The slicer also preferably generates a hash for rapidly identifying a flow that may have this signature from a database of known flows.

The flow signature of the packet, the hash and at least some of the payload are passed to an analyzer subsystem. In a hardware embodiment, the analyzer subsystem includes a unified flow key buffer (UFKB) for receiving parts of packets from the parser subsystem and for storing signatures in process, a lookup/update engine (LUE) to lookup a database of flow records for previously encountered conversational flows to determine whether a signature is from an existing flow, a state processor (SP) for performing state processing, a flow insertion and deletion engine (FIDE) for inserting new flows into the database of flows, a memory for storing the database of flows, and a cache for speeding up access to the memory containing the flow database. The LUE, SP, and FIDE are all coupled to the UFKB, and to the cache.

Each flow-entry includes one or more statistical measures, e.g., the packet count related to the flow, the time of arrival of a packet, the time differential.

In the preferred hardware embodiment, each of the LUE, state processor, and FIDE operate independently from the other two engines. The state processor performs one or more operations specific to the state of the flow.

Because of the high speed that packets may be entering the system, it is desirable to maximize the hit rate in a cache system. Typical prior-art cache systems are used to expediting memory accesses to and from microprocessor systems. Various mechanisms are available in such prior art systems to predict the lookup such that the hit rate can be maximized. Prior art caches, for example, can use a lookahead mechanism to predict both instruction cache lookups and data cache lookups. Such lookahead mechanisms are not available for a cache subsystem for the packet monitoring application. When a new packet enters the monitor, the next cache access, for example from the lookup engine, may be for a totally different conversational flow than the last cache lookup, and there is no way ahead of time of knowing what flow the next packet will belong to.

Thus there is a need in the art for a cache subsystem suitable for use in a packet monitor. One desirable property of such a cache system is a least recently used (LRU) replacement policy that replaces the LRU flow-entry when a cache replacement is needed. Replacing least recently used flow-entries is preferred because it is likely that a packet following a recent packet will belong to the same flow. Thus, the signature of a new packet will likely match a recently used flow record. Conversely, it is not highly likely that a packet associated with the least recently used flow-entry will soon arrive.

A hash is often used to facilitate lookups. Such a hash may spread entries randomly in a database. In such a case, a associative cache is desirable.

There thus is a need for a associative cache subsystem that also includes a LRU replacement policy.

SUMMARY

Described herein is an associative cache system for looking up one or more elements of an external memory. The cache system comprises a set of cache memory elements coupled to the external memory, a set of content addressable memory cells (CAMs) containing an address and a pointer to one of the cache memory elements, and including a matching circuit having an input such that the CAM asserts a match output when the input is the same as the address in the CAM cell. The cache memory element which a particular CAM points to changes over time. In the preferred implementation, the CAMs are connected in an order from top to bottom, and the bottom CAM points to the least recently used cache memory element.

BRIEF DESCRIPTION OF THE DRAWINGS

Although the present invention is better understood by referring to the detailed preferred embodiments, these should not be taken to limit the present invention to any specific embodiment because such embodiments are provided only for the purposes of explanation. The embodiments, in turn, are explained with the aid of the following figures.

DETAILED DESCRIPTION OF THE PREFERRED EMBODIMENTS

Note that this document includes hardware diagrams and descriptions that may include signal names. In most cases, the names are sufficiently descriptive, in other cases however the signal names are not needed to understand the operation and practice of the invention.

Operation in a Network

Figure 1:
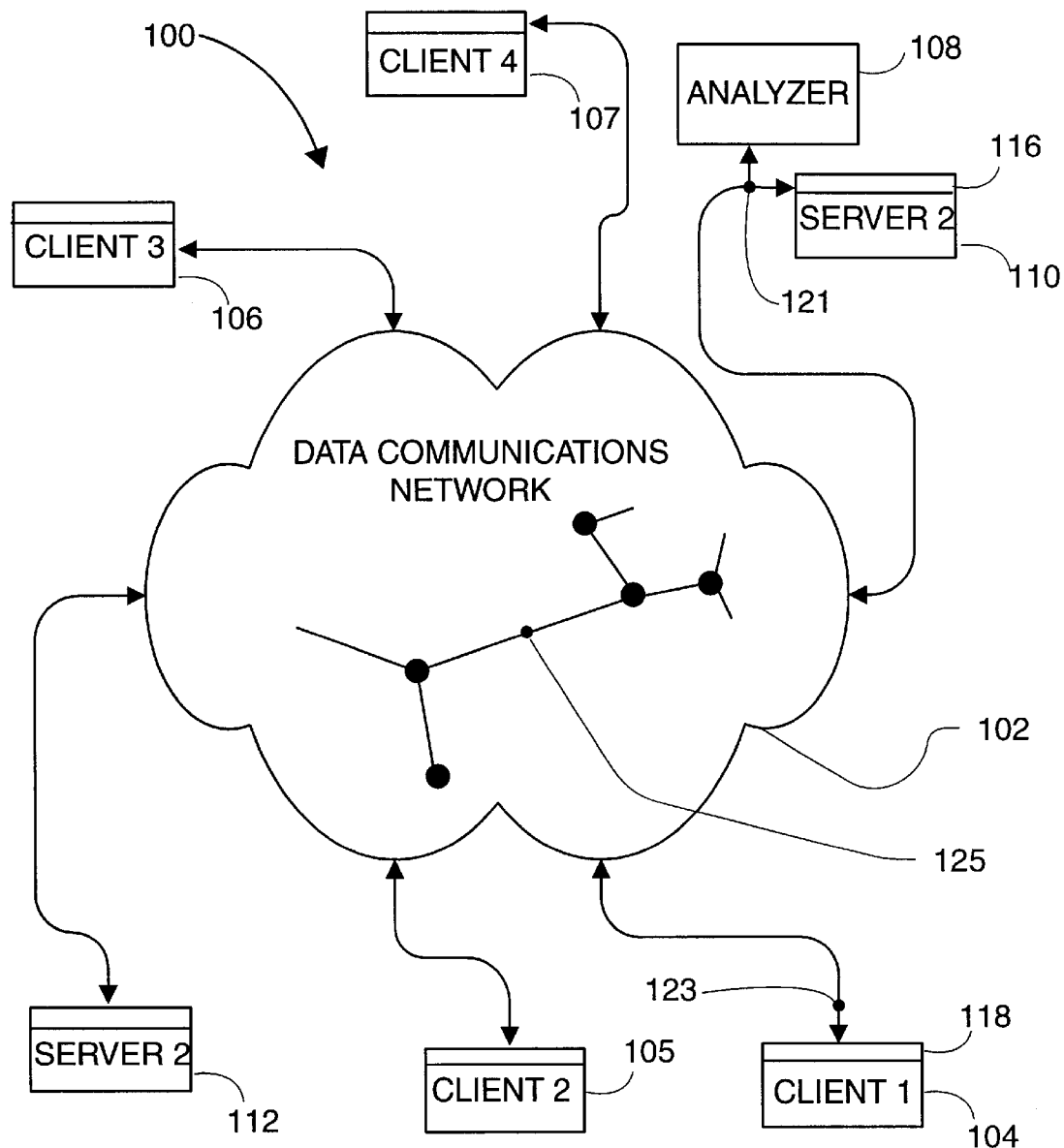
FIG. 1 is a functional block diagram of a network embodiment of the present invention in which a monitor is connected to analyze packets passing at a connection point.

FIG. 1 represents a system embodiment of the present invention that is referred to herein by the general reference numeral 100. The system 100 has a computer network 102 that communicates packets (e.g., IP datagrams) between various computers, for example between the clients 104–107 and servers 110 and 112. The network is shown schematically as a cloud with several network nodes and links shown in the interior of the cloud. A monitor 108 examines the packets passing in either direction past its connection point 121 and, according to one aspect of the invention, can elucidate what application programs are associated with each packet. The monitor 108 is shown examining packets (i.e., datagrams) between the network interface 116 of the server 110 and the network. The monitor can also be placed at other points in the network, such as connection point 123 between the network 102 and the interface 118 of the client 104, or some other location, as indicated schematically by connection point 125 somewhere in network 102. Not shown is a network packet acquisition device at the location 123 on the network for converting the physical information on the network into packets for input into monitor 108. Such packet acquisition devices are common.

Various protocols may be employed by the network to establish and maintain the required communication, e.g., TCP/IP, etc. Any network activity—for example an application program run by the client 104 (CLIENT 1) communicating with another running on the server 110 (SERVER 2)—will produce an exchange of a sequence of packets over network 102 that is characteristic of the respective programs and of the network protocols. Such characteristics may not be completely revealing at the individual packet level. It may require the analyzing of many packets by the monitor 108 to have enough information needed to recognize particular application programs. The packets may need to be parsed then analyzed in the context of various protocols, for example, the transport through the application session layer protocols for packets of a type conforming to the ISO layered network model.

Communication protocols are layered, which is also referred to as a protocol stack. The ISO (International Standardization Organization) has defined a general model tha provides a framework for design of communication protocol layers. This model, shown in table form below, serves as a basic reference for understanding the functionaly of existing communication protocols.

| | ISO MODEL | |
|---|---|---|
| Layer | Functionality | Example |
| 7 | Application | Telnet, NFS, Novell NCP, HTTP, H.323 |
| 6 | Presentation | XDR |
| 5 | Session | RPC, NETBIOS, SNMP, etc. |
| 4 | Transport | TCP, Novel SPX, UDP, etc. |
| 3 | Network | IP, Novell IPX, VIP, AppleTalk, etc. |
| 2 | Data Link | Network Interface Card (Hardware Interface). MAC layer |
| 1 | Physical | Ethernet, Token Ring, Frame Relay, ATM, T1 (Hardware Connection) |

Different communication protocols employ different levels of the ISO model or may use a layerd model that is similar to but which does not exactly conform to the ISO model. A protocol in a certain layer may not be visible to protocols employed at other layers. For example, an application (Level 7) may not be able to identify the source computer for a communication attempt (Levels 2–3).

In some communication arts, the term "frame" generally refers to encapsulated data at OSI layer 2, including a destination address, control bits for flow control, the data or payload, and CRC (cyclic redundancy check) data for error checking. The term "packet" generally refers to encapsulated data at OSI layer 3. In the TCP/IP world, the term "datagram" is also used. In this specification, the term "packet" is intended to encompass packets, datagrams, frames, and cells. In general, a packet format or frame format refers to how data is encapsulated with various fields and headers for transmission across a network. For example, a data packet typically includes an address destination field, a length field, an error correcting code (ECC) field, or cyclic redundancy check (CRC) field, as well as headers and footers to identify the beginning and end of the packet. The terms "packet format" and "frame format," also referred to as "cell format," are generally synonymous.

Monitor 108 looks at every packet passing the connection point 121 for analysis. However, not every packet carries the same information useful for recognizing all levels of the protocol. For example, in a conversational flow associated with a particular application, the application will cause the server to send a type-A packet, but so will another. If, though, the particular application program always follows a type-A packet with the sending of a type-B packet, and the other application program does not, then in order to recognize packets of that application's conversational flow, the monitor can be available to recognize packets that match the type-B packet to associate with the type-A packet. If such is recognized after a type-A packet, then the particular application program's conversational flow has started to reveal itself to the monitor 108.

Further packets may need to be examined before the conversational flow can be identified as being associated with the application program. Typically, monitor 108 is simultaneously also in partial completion of identifying other packet exchanges that are parts of conversational flows associated with other applications. One aspect of monitor 108 is its ability to maintain the state of a flow. The state of a flow is an indication of all previous events in the flow that lead to recognition of the content of all the protocol levels, e.g., the ISO model protocol levels. Another aspect of the invention is forming a signature of extracted characteristic portions of the packet that can be used to rapidly identify packets belonging to the same flow.

In real-world uses of the monitor 108, the number of packets on the network 102 passing by the monitor 108's connection point can exceed a million per second. Consequently, the monitor has very little time available to analyze and type each packet and identify and maintain the state of the flows passing through the connection point. The monitor 108 therefore masks out all the unimportant parts of each packet that will not contribute to its classification. However, the parts to mask-out will change with each packet depending on which flow it belongs to and depending on the state of the flow.

The recognition of the packet type, and ultimately of the associated application programs according to the packets that their executions produce, is a multi-step process within the monitor 108. At a first level, for example, several application programs will all produce a first kind of packet. A first "signature" is produced from selected parts of a packet that will allow monitor 108 to identify efficiently any packets that belong to the same flow. In some cases, that packet type may be sufficiently unique to enable the monitor to identify the application that generated such a packet in the conversational flow. The signature can then be used to efficiently identify all future packets generated in traffic related to that application.

In other cases, that first packet only starts the process of analyzing the conversational flow, and more packets are necessary to identify the associated application program. In such a case, a subsequent packet of a second type—buut that potentially belongs to the same conversational flow—is recognized by using the signature. At such a second level, then, only a few of those application programs will have conversational flows that can produce such a second packet type. At this level in the process of classification, all application programs that are not in the set of those that lead to such a sequence of packet types may be excluded in the process of classifying the conversational flow that includes these two packets. Based on the known patterns for the protocol and for the possible applications, a signature is produced that allows recognition of any future packets that may follow in the conversational flow.

It may be that the application is now recognized, or recognition may need to proceed to a third level of analysis using the second level signature. For each packet, therefore, the monitor parses the packet and generates a signature to determine if this signature identified a previously encountered flow, or shall be used to recognize future packets belonging to the same conversational flow. In real time, the packet is further analyzed in the context of the sequence of previously encountered packets (the state), and of the possible future sequences such a past sequence may generate in conversational flows associated with different applications. A new signature for recognizing future packets may also be generated. This process of analysis continues until the applications are identified. The last generated signature may then be used to efficiently recognize future packets associated with the same conversational flow. Such an arrangement makes it possible for the monitor 108 to cope with millions of packets per second that must be inspected.

Another aspect of the invention is adding Eavesdropping. In alternative embodiments of the present invention capable of eavesdropping, once the monitor 108 has recognized the executing application programs passing through some point in the network 102 (for example, because of execution of the applications by the client 105 or server 110), the monitor sends a message to some general purpose processor on the network that can input the same packets from the same location on the network, and the processor then loads its own executable copy of the application program and uses it to read the content being exchanged over the network. In other words, once the monitor 108 has accomplished recognition of the application program, eavesdropping can commence.

The Network Monitor

Figure 3:
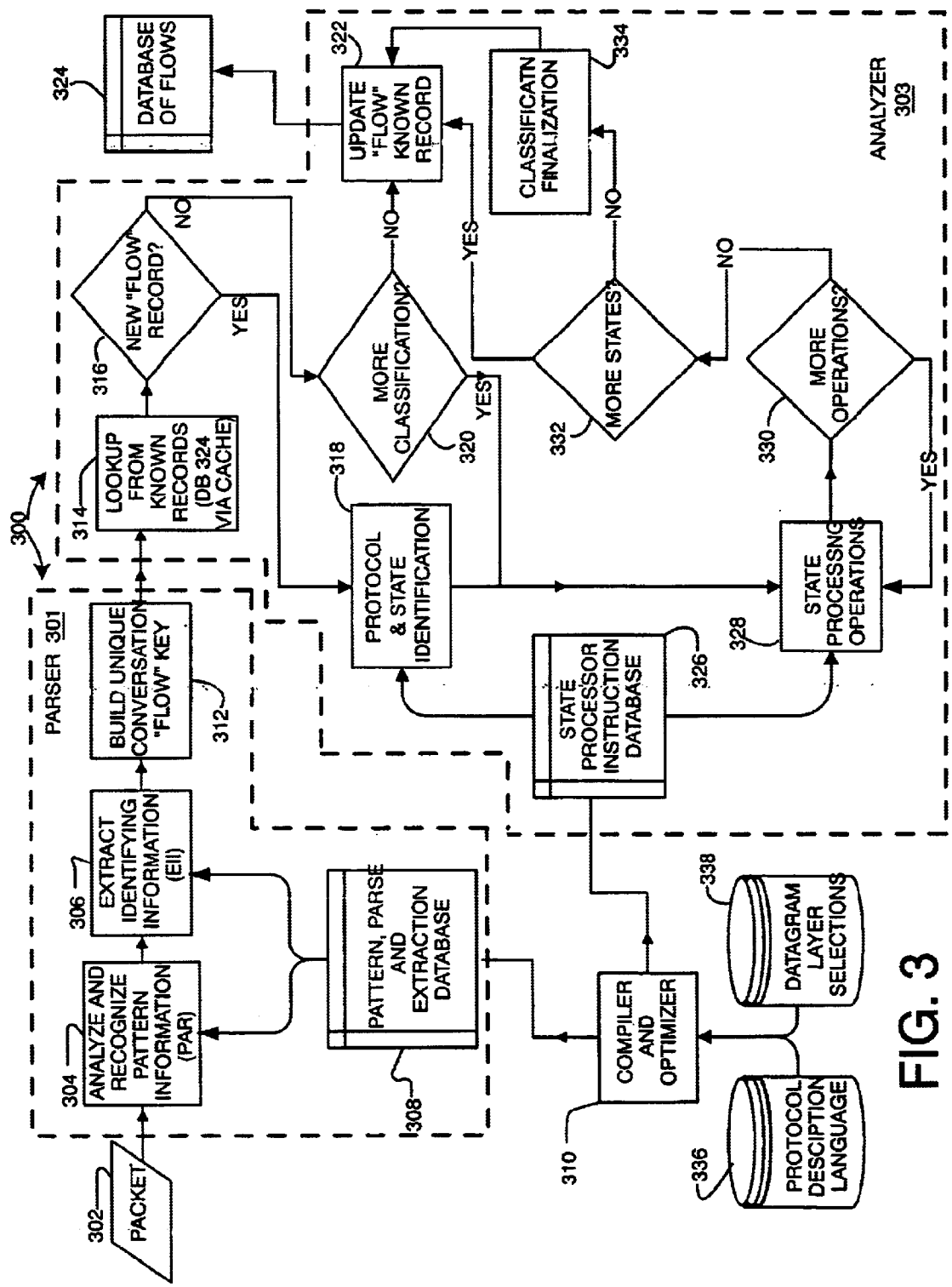
FIG. 3 is a functional block diagram of a process embodiment of the present invention that can operate as the packet monitor shown in FIG. 1. This process may be implemented in software or hardware.

FIG. 3 shows a network packet monitor 300, in an embodiment of the present invention that can be implemented with computer hardware and/or software. The system 300 is similar to monitor 108 in FIG. 1. A packet 302 is examined, e.g., from a packet acquisition device at the location 121 in network 102 (FIG. 1), and the packet evaluated, for example in an attempt to determine its characteristics, e.g., all the protocol information in a multilevel model, including what server application produced the packet.

The packet acquisition device is a common interface that converts the physical signals and then decodes them into bits, and into packets, in accordance with the particular network (Ethernet, frame relay, ATM, etc.). The acquisition device indicates to the monitor 108 the type of network of the acquired packet or packets.

Aspects shown here include: (1) the initialization of the monitor to generate what operations need to occur on packets of different types—accomplished by compiler and optimizer 310, (2) the processing—parsing and extraction of selected portions—of packets to generate an identifying signature—accomplished by parser subsystem 301, and (3) the analysis of the packets—accomplished by analyzer 303.

The purpose of compiler and optimizer 310 is to provide protocol specific information to parser subsystem 301 and to analyzer subsystem 303. The initialization occurs prior to operation of the monitor, and only needs to re-occur when new protocols are to be added.

A flow is a stream of packets being exchanged between any two addresses in the network. For each protocol there are known to be several fields, such as the destination (recipient), the source (the sender), and so forth, and these and other fields are used in monitor 300 to identify the flow. There are other fields not important for identifying the flow, such as checksums, and those parts are not used for identification.

Parser subsystem 301 examines the packets using pattern recognition process 304 that parses the packet and determines the protocol types and associated headers for each protocol layer that exists in the packet 302. An extraction process 306 in parser subsystem 301 extracts characteristic portions (signature information) from the packet 302. Both the pattern information for parsing and the related extraction operations, e.g., extraction masks, are supplied from a parsing-pattern-structures and extraction-operations database (parsing/extractions database) 308 filled by the compiler and optimizer 310.

The protocol description language (PDL) files 336 describes both patterns and states of all protocols that an occur at any layer, including how to interpret header information, how to determine from the packet header information the protocols at the next layer, and what information to extract for the purpose of identifying a flow, and ultimately, applications and services. The layer selections database 338 describes the particular layering handled by the monitor. That is, what protocols run on top of what protocols at any layer level. Thus 336 and 338 combined describe how one would decode, analyze, and understand the information in packets, and, furthermore, how the information is layered. This information is input into compiler and optimizer 310.

When compiler and optimizer 310 executes, it generates two sets of internal data structures. The first is the set of parsing/extraction operations 308. The pattern structures include parsing information and describe what will be recognized in the headers of packets; the extraction operations are what elements of a packet are to be extracted from the packets based on the patterns that get matched. Thus, database 308 of parsing/extraction operations includes information describing how to determine a set of one or more protocol dependent extraction operations from data in the packet that indicate a protocol used in the packet.

The other internal data structure that is built by compiler 310 is the set of state patterns and processes 326. These are the different states and state transitions that occur in different conversational flows, and the state operations that need to be performed (e.g., patterns that need to be examined and new signatures that need to be built) during any state of a conversational flow to further the task of analyzing the conversational flow.

Thus, compiling the PDL files and layer selections provides monitor 300 with the information it needs to begin processing packets. In an alternate embodiment, the contents of one or more of databases 308 and 326 may be manually or otherwise generated. Note that in some embodiments the layering selections information is inherent rather than explicitly described. For example, since a PDL file for a protocol includes the child protocols, the parent protocols also may be determined.

In the preferred embodiment, the packet 302 from the acquisition device is input into a packet buffer. The pattern recognition process 304 is carried out by a pattern analysis and recognition (PAR) engine that analyzes and recognizes patterns in the packets. In particular, the PAR locates the next protocol field in the header and determines the length of the header, and may perform certain other tasks for certain types of protocol headers. An example of this is type and length comparison to distinguish an IEEE 802.3 (Ethernet) packet from the older type 2 (or Version 2) Ethernet packet, also called a DIGITAL-Intel-Xerox (DIX) packet. The PAR also uses the pattern structures and extraction operations database 308 to identify the next protocol and parameters associated with that protocol that enables analysis of the next protocol layer. Once a pattern or a set of patterns has been identified, it/they will be associated with a set of none or more extraction operations. These extraction operations (in the form of commands and associated parameters) are passed to the extraction process 306 implemented by an extracting and information identifying (EII) engine that extracts selected parts of the packet, including identifying information from the packet as required for recognizing this packet as part of a flow. The extracted information is put in sequence and then processed in block 312 to build a unique flow signature (also called a "key") for this flow. A flow signature depends on the protocols used in the packet. For some protocols, the extracted components may include source and destination addresses. For example, Ethernet frames have end-point addresses that are useful in building a better flow signature. Thus, the signature typically includes the client and server address pairs. The signature is used to recognize further packets that are or may be part of this flow.

In the preferred embodiment, the building of the flow key includes generating a hash of the signature using a hash function. The purpose if using such a hash is conventional—to spread flow-entries identified by the signature across a database for efficient searching. The hash generated is preferably based on a hashing algorithm and such hash generation is known to those in the art.

In one embodiment, the parser passes data from the packet—a parser record—that includes the signature (i.e., selected portions of the packet), the hash, and the packet itself to allow for any state processing that requires further data from the packet. An improved embodiment of the parser subsystem might generate a parser record that has some predefined structure and that includes the signature, the hash, some flags related to some of the fields in the parser record, and parts of the packet's payload that the parser subsystem has determined might be required for further processing, e.g., for state processing.

Note that alternate embodiments may use some function other than concatenation of the selected portions of the packet to make the identifying signature. For example, some "digest function" of the concatenated selected portions may be used.

The parser record is passed onto lookup process 314 which looks in an internal data store of records of known flows that the system has already encountered, and decides (in 316) whether or not this particular packet belongs to a known flow as indicated by the presence of a flow-entry matching this flow in a database of known flows 324. A record in database 324 is associated with each encountered flow.

The parser record enters a buffer called the unified flow key buffer (UFKB). The UFKB stores the data on flows in a data structure that is similar to the parser record, but that includes a field that can be modified. In particular, one or the UFKB record fields stores the packet sequence number, and another is filled with state information in the form of a program counter for a state processor that implements state processing 328.

The determination (316) of whether a record with the same signature already exists is carried out by a lookup engine (LUE) that obtains new UFKB records and uses the hash in the UFKB record to lookup if there is a matching known flow. In the particular embodiment, the database of known flows 324 is in an external memory. A cache is associated with the database 324. A lookup by the LUE for a known record is carried out by accessing the cache using the hash, and if the entry is not already present in the cache, the entry is looked up (again using the hash) in the external memory.

The flow-entry database 324 stores flow-entries that include the unique flow-signature, state information, and extracted information from the packet for updating flows, and one or more statistical about the flow. Each entry completely describes a flow. Database 324 is organized into bins that contain a number, denoted N, of flow-entries (also called flow-entries, each a bucket), with N being 4 in the preferred embodiment. Buckets (i.e., flow-entries) are accessed via the hash of the packet from the parser subsystem 301 (i.e., the hash in the UFKB record). The hash spreads the flows across the database to allow for fast lookups of entries, allowing shallower buckets. The designer selects the bucket depth N based on the amount of memory attached to the monitor, and the number of bits of the hash data value used. For example, in one embodiment, each flow-entry is 128 bytes long, so for 128K flow-entries, 16 Mbytes are required. Using a 16-bit hash gives two flow-entries per bucket. Empirically, this has been shown to be more than adequate for the vast majority of cases. Note that another embodiment uses flow-entries that are 256 bytes long.

Herein, whenever an access to database 324 is described, it is to be understood that the access is via the cache, unless otherwise stated or clear from the context.

If there is no flow-entry found matching the signature, i.e., the signature is for a new flow, then a protocol and state identification process 318 further determines the state and protocol. That is, process 318 determines the protocols and where in the state sequence for a flow for this protocol's this packet belongs. Identification process 318 uses the extracted information and makes reference to the database 326 of state patterns and processes. Process 318 is then followed by any state operations that need to be executed on this packet by a state processor 328.

If the packet is found to have a matching flow-entry in the database 324 (e.g., in the cache), then a process 320 determines, from the looked-up flow-entry, if more classification by state processing of the flow signature is necessary. If not, a process 322 updates the flow-entry in the flow-entry database 324 (e.g., via the cache). Updating includes updating one or more statistical measures stored in the flow-entry. In our embodiment, the statistical measures are stored in counters in the flow-entry.

If state processing is required, state process 328 is commenced. State processor 328 carries out any state operations specified for the state of the flow and updates the state to the next state according to a set of state instructions obtained form the state pattern and processes database 326.

The state processor 328 analyzes both new and existing flows in order to analyze all levels of the protocol stack, ultimately classifying the flows by application (level 7 in the ISO model). It does this by proceeding from state-to-state based on predefined state transition rules and state operations as specified in state processor instruction database 326. A state transition rule is a rule typically containing a test followed by the next-state to proceed to if the test result is true. An operation is an operation to be performed while the state processor is in a particular state—for example, in order to evaluate a quantity needed to apply the state transition rule. The state processor goes through each rule and each state process until the test is true, or there are no more tests to perform.

In general, the set of state operations may be none or more operations on a packet, and carrying out the operation or operations may leave one in a state that causes exiting the system prior to completing the identification, but possibly knowing more about what state and state processes are needed to execute next, i.e., when a next packet of this flow is encountered. As an example, a state process (set of state operations) at a particular state may build a new signature for future recognition packets of the next state.

By maintaining the state of the flows and knowing that new flows may be set up using the information from previously encountered flows, the network traffic monitor 300 provides for (a) single-packet protocol recognition of flows, and (b) multiple-packet protocol recognition of flows. Monitor 300 can even recognize the application program from one or more disjointed sub-flows that occur in server announcement type flows. What may seem to prior art monitors to be some unassociated flow, may be recognized by the inventive monitor using the flow signature to be a sub-flow associated with a previously encountered sub-flow.

Thus, state processor 328 applies the first state operation to the packet for this particular flow-entry. A process 330 decides if more operations need to be performed for this state. If so, the analyzer continues looping between block 330 and 328 applying additional state operations to this particular packet until all those operations are completed—that is, there are no more operations for this packet in this state. A process 332 decides if there are further states to be analyzed for this type of flow according to the state of the flow and the protocol, in order to fully characterize the flow. If not, the conversational flow has now been fully characterized and a process 334 finalizes the classification of the conversational flow for the flow.

In the particular embodiment, the state processor 328 starts the state processing by using the last protocol recognized by the parser as an offset into a jump table (jump vector). The jump table finds the state processor instructions to use for that protocol in the state patterns and processes database 326. Most instructions test something in the unified flow key buffer, or the flow-entry in the database of known flows 324, if the entry exists. The state processor may have to test bits, do comparisons, add, or subtract to perform the test. For example, a common operation carried out by the state processor is searching for one or more patterns in the payload part of the UFKB.

Thus, in 332 in the classification, the analyzer decides whether the flow is at an end state. If not at an end state, the flow-entry is updated (or created if a new flow) for this flow-entry in process 322.

Furthermore, if the flow is known and if in 332 it is determined that there are further states to be processed using later packets, the flow-entry is updated in process 322.

The flow-entry also is updated after classification finalization so that any further packets belonging to this flow will be readily identified from their signature as belonging to this fully analyzed conversational flow.

After updating, database 324 therefore includes the set of all the conversational flows that have occurred.

Thus, the embodiment of present invention shown in FIG. 3 automatically maintains flow-entries, which in one aspect includes storing states. The monitor of FIG. 3 also generates characteristic parts of packets—the signatures—that can be used to recognize flows. The flow-entries may be identified and accessed by their signatures. Once a packet is identified to be from a known flow, the state of the flow is known and this knowledge enables state transition analysis to be performed in real time for each different protocol and application. In a complex analysis, state transitions are traversed as more and more packets are examined. Future packets that are part of the same conversational flow have their state analysis continued from a previously achieved state. When enough packets related to an application of interest have been processed, a final recognition state is ultimately reached, i.e., a set of states has been traversed by state analysis to completely characterize the conversational flow. The signature for that final state enables each new incoming packet of the same conversational flow to be individually recognized in real time.

In this manner, one of the great advantages of the present invention is realized. Once a particular set of state transitions has been traversed for the first time and ends in a final state, a short-cut recognition pattern—a signature—can be generated that will key on every new incoming packet that relates to the conversational flow. Checking a signature involves a simple operation, allowing high packet rates to be successfully monitored on the network.

In improved embodiments, several state analyzers are run in parallel so that a large number of protocols and applications may be checked for. Every known protocol and application will have at least one unique set of state transitions, and can therefore be uniquely identified by watching such transitions.

When each new conversational flow starts, signatures that recognize the flow are automatically generated on-the-fly, and as further packets in the conversational flow are encountered, signatures are updated and the states of the set of state transitions for any potential application are further traversed according to the state transition rules for the flow. The new states for the flow—those associated with a set of state transitions for one or more potential applications—are added to the records of previously encountered states for easy recognition and retrieval when a new packet in the flow is encountered.

Detailed Operation

Figure 4:
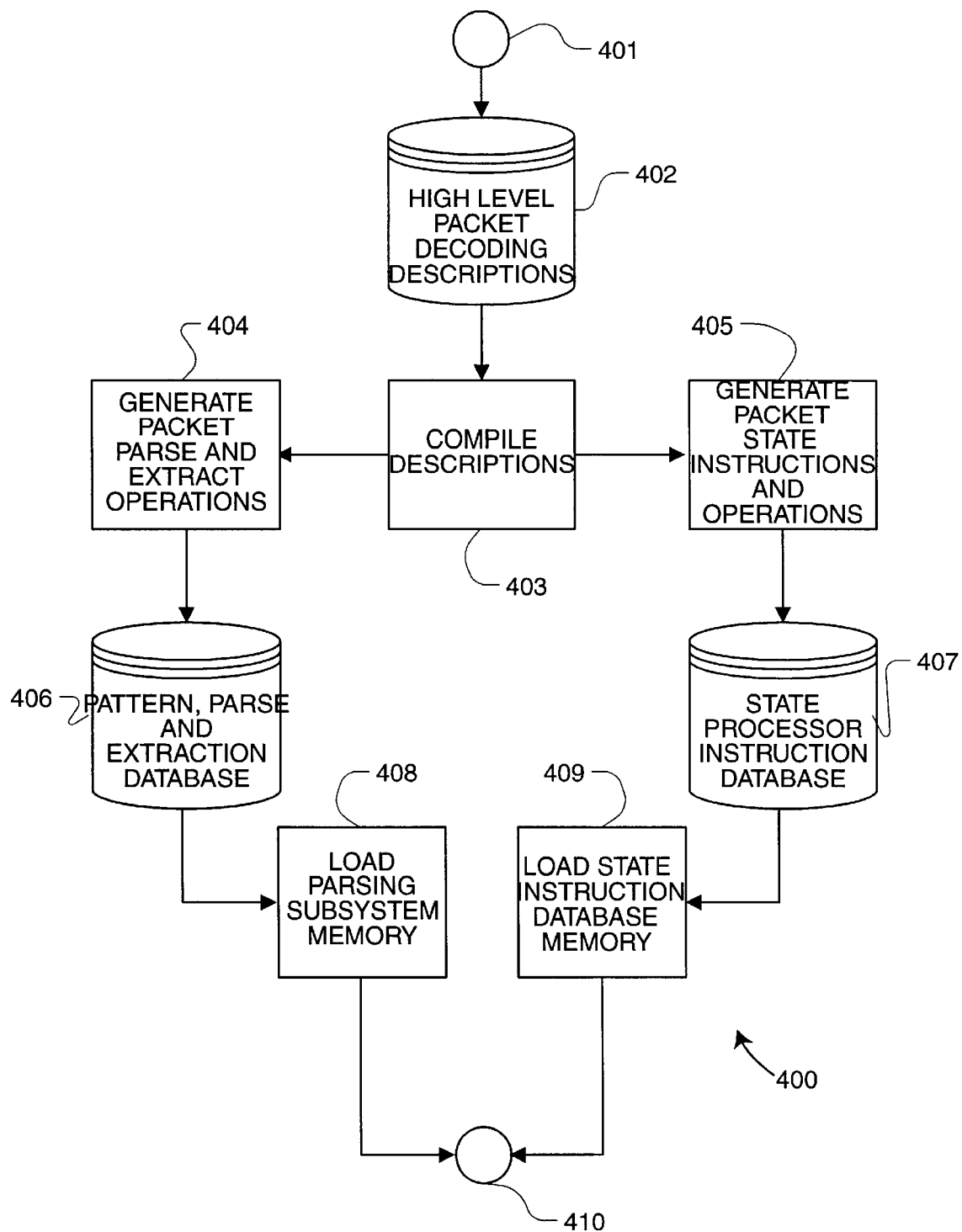
FIG. 4 is a flowchart of a high-level protocol language compiling and optimization process, which in one embodiment may be used to generate data for monitoring packets according to versions of the present invention.

FIG. 4 diagrams an initialization system 400 that includes the compilation process. That is, part of the initialization generates the pattern structures and extraction operations database 308 and the state instruction database 328. Such initialization can occur off-line or from a central location.

The different protocols that can exist in different layers may be thought of as nodes of one or more trees of linked nodes. The packet type is the root of a tree (called level 0). Each protocol is either a parent node or a terminal node. A parent node links a protocol to other protocols (child protocols) that can be at higher layer levels. Thus a protocol may have zero or more children. Ethernet packets, for example, have several variants, each having a basic format that remains substantially the same. An Ethernet packet (the root or level 0 node) may be an Ethertype packet—also called an Ethernet Type/Version 2 and a DIX (DIGITAL-Intel-Xerox packet)—or an IEEE 803.2 packet. Continuing with the IEEE 802.3 packet, one of the children nodes may be the IP protocol, and one of the children of the IP protocol may be the TCP protocol.

Figure 16:
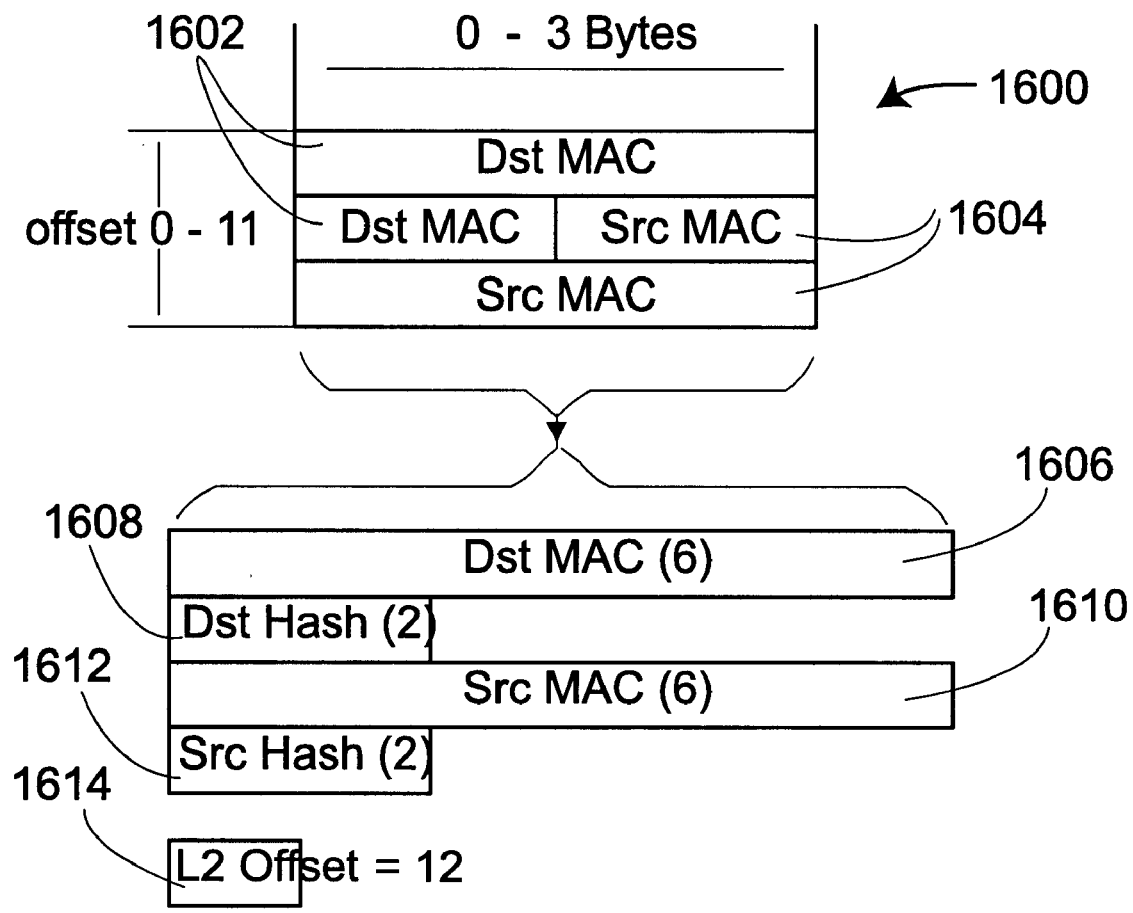
FIG. 16 is an example of the top (MAC) layer of an Ethernet packet and some of the elements that may be extracted to form a signature according to one aspect of the invention.

FIG. 16 shows the header 1600 (base level 1) of a complete Ethernet frame (i.e., packet) of information and includes information on the destination media access control address (Dst MAC 1602) and the source media access control address (Src MAC 1604). Also shown in FIG. 16 is some (but not all) of the information specified in the PDL files for extraction the signature.

Figure 17A:
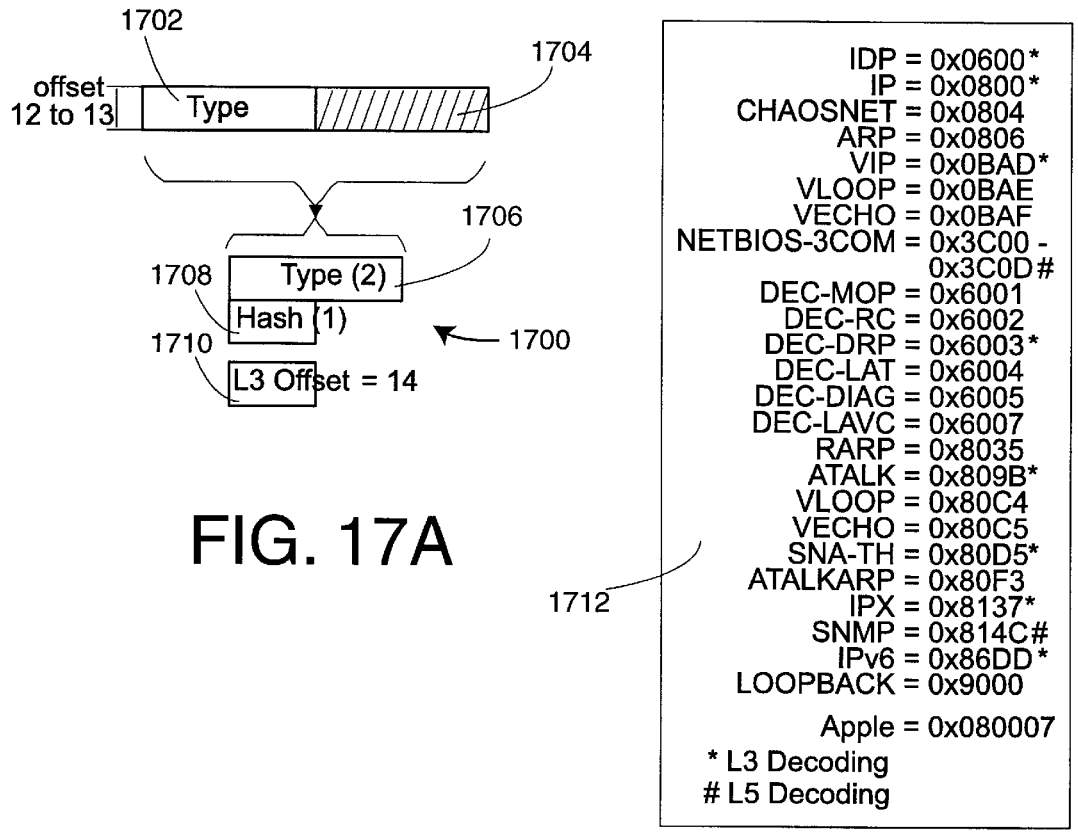
FIG. 17A is an example of the header of an Ethertype type of Ethernet packet of FIG. 16 and some of the elements that may be extracted to form a signature according to one aspect of the invention.
Figure 17B:
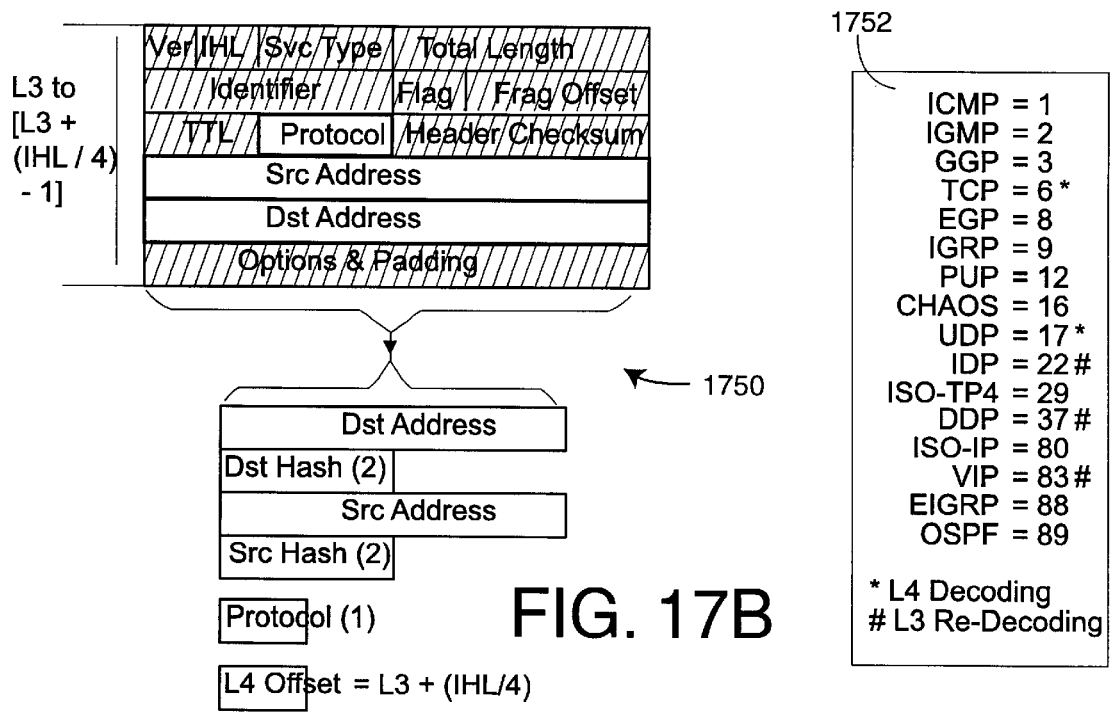
FIG. 17B is an example of an IP packet, for example, of the Ethertype packet shown in FIGS. 16 and 17A, and some of the elements that may be extracted to form a signature according to one aspect of the invention.

FIG. 17A now shows the header information for the next level (level-2) for an Ethertype packet 1700. For an Ethertype packet 1700, the relevant information from the packet that indicates the next layer level is a two-byte type field 1702 containing the child recognition pattern for the next level. The remaining information 1704 is shown hatched because it not relevant for this level. The list 1712 shows the possible children for an Ethertype packet as indicated by what child recognition pattern is found offset 12. FIG. 17B shows the structure of the header of one of the possible next levels, that of the IP protocol. The possible children of the IP protocol are shown in table 1752.

Figure 18A:
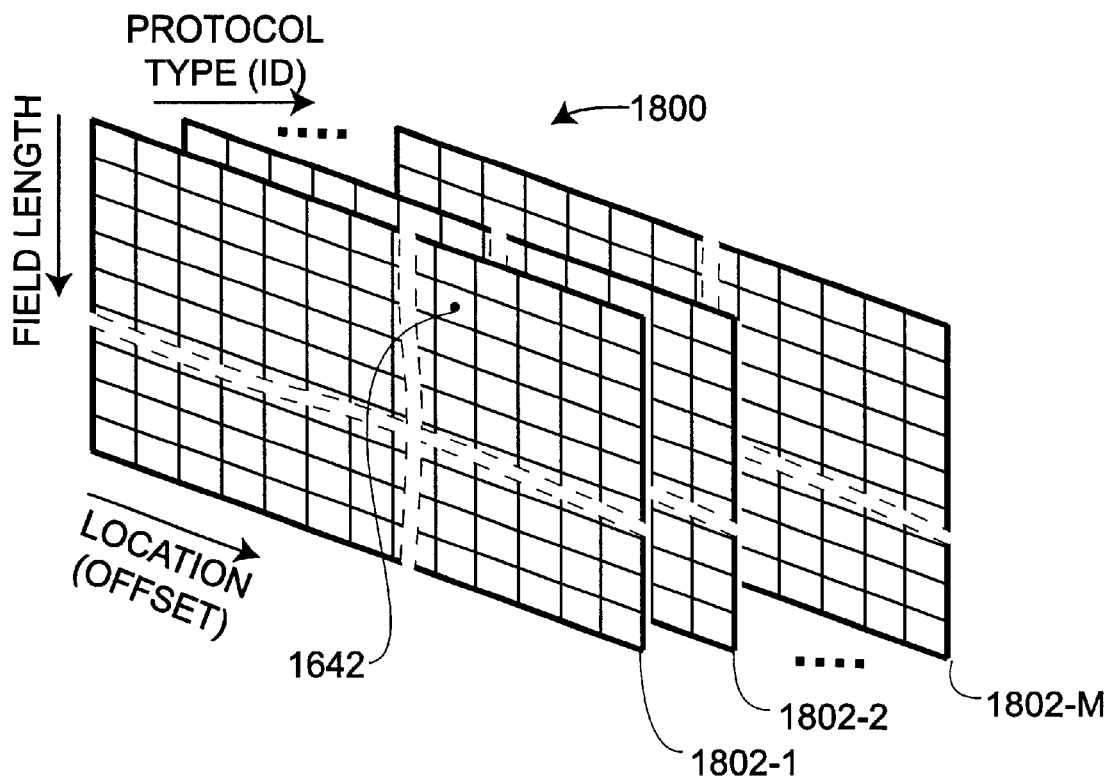
FIG. 18A is a three dimensional structure that can be used to store elements of the pattern, parse and extraction database used by the parser subsystem in accordance to one embodiment of the invention.

The pattern, parse, and extraction database (pattern recognition database, or PRD) 308 generated by compilation process 310, in one embodiment, is in the form of a three dimensional structure that provides for rapidly searching packet headers for the next protocol. FIG. 18A shows such a 3-D representation 1800 (which may be considered as an indexed set of 2-D representations). A compressed form of the 3-D structure is preferred.

Figure 18B:
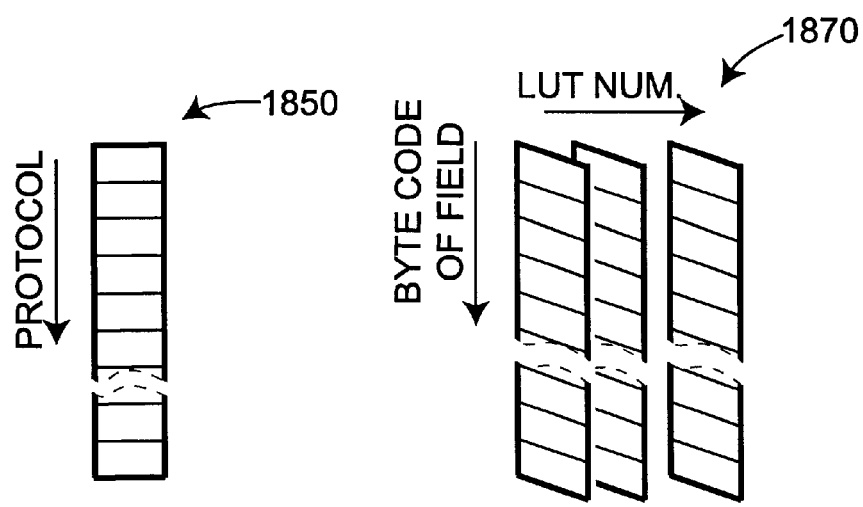
FIG. 18B is an alternate form of storing elements of the pattern, parse and extraction database used by the parser subsystem in accordance to another embodiment of the invention.

An alternate embodiment of the data structure used in database 308 is illustrated in FIG. 18B. Thus, like the 3-D structure of FIG. 18A, the data structure permits rapid searches to be performed by the pattern recognition process 304 by indexing locations in a memory rather than performing address link computations. In this alternate embodiment, the PRD 308 includes two parts, a single protocol table 1850 (PT) which has an entry for each protocol known for the monitor, and a series of Look Up Tables 1870 (LUT's) that are used to identify known protocols and their children. The protocol table includes the parameters needed by the pattern analysis and recognition process 304 (implemented by PRE 1006) to evaluate the header information in the packet that is associated with that protocol, and parameters needed by extraction process 306 (implemented by slicer 1007) to process the packet header. When there are children, the PT describes which bytes in the header to evaluate to determine the child protocol. In particular, each PT entry contains the header length, an offset to the child, a slicer command, and some flags.

The pattern matching is carried out by finding particular "child recognition codes" in the header fields, and using these codes to index one or more of the LUT's. Each LUT entry has a node code that can have one of four values, indicating the protocol that has been recognized, a code to indicate that the protocol has been partially recognized (more LUT lookups are needed), a code to indicate that this is a terminal node, and a null node to indicate a null entry. The next LUT to lookup is also returned from a LUT lookup.

Compilation process is described in FIG. 4. The source-code information in the form of protocol description files is shown as 402. In the particular embodiment, the high level decoding descriptions includes a set of protocol description files 336, one for each protocol, and a set of packet layer selections 338, which describes the particular layering (sets of trees of protocols) that the monitor is to be able to handle.

A compiler 403 compiles the descriptions. The set of packet parse-and-extract operations 406 is generated (404), and a set of packet state instructions and operations 407 is generated (405) in the form of instructions for the state processor that implements state processing process 328. Data files for each type of application and protocol to be recognized by the analyzer are downloaded from the pattern, parse, and extraction database 406 into the memory systems of the parser and extraction engines. (See the parsing process 500 description and FIG. 5; the extraction process 600 description and FIG. 6; and the parsing subsystem hardware description and FIG. 10). Data files for each type of application and protocol to be recognized by the analyzer are also downloaded from the state-processor instruction database 407 into the state processor. (see the state processor 1108 description and FIG. 11.).

Note that generating the packet parse and extraction operations builds and links the three dimensional structure (one embodiment) or the or all the lookup tables for the is PRD.

Because of the large number of possible protocol trees and subtrees, the compiler process 400 includes optimization that compares the trees and subtrees to see which children share common parents. When implemented in the form of the LUT's, this process can generate a single LUT from a plurality of LUT's. The optimization process further includes a compaction process that reduces the space needed to store the data of the PRD.

As an example of compaction, consider the 3-D structure of FIG. 18A that can be thought of as a set of 2-D structures each representing a protocol. To enable saving space by using only one array per protocol which may have several parents, in one embodiment, the pattern analysis subprocess keeps a "current header" pointer. Each location (offset) index for each protocol 2-D array in the 3-D structure is a relative location starting with the start of header for the particular protocol. Furthermore, each of the two-dimensional arrays is sparse. The next step of the optimization, is checking all the 2-D arrays against all the other 2-D arrays to find out which ones can share memory. Many of these 2-D arrays are often sparsely populated in that they each have only a small number of valid entries. So, a process of "folding" is next used to combine two or more 2-D arrays together into one physical 2-D array without losing the identity of any of the original 2-D arrays (i.e., all the 2-D arrays continue to exist logically). Folding can occur between any 2-D arrays irrespective of their location in the tree as long as certain conditions are met. Multiple arrays may be combined into a single array as long as the individual entries do not conflict with each other. A fold number is then used to associate each element with its original array. A similar folding process is used for the set of LUTs 1850 in the alternate embodiment of FIG. 18B.

In 410, the analyzer has been initialized and is ready to perform recognition.

Figure 5:
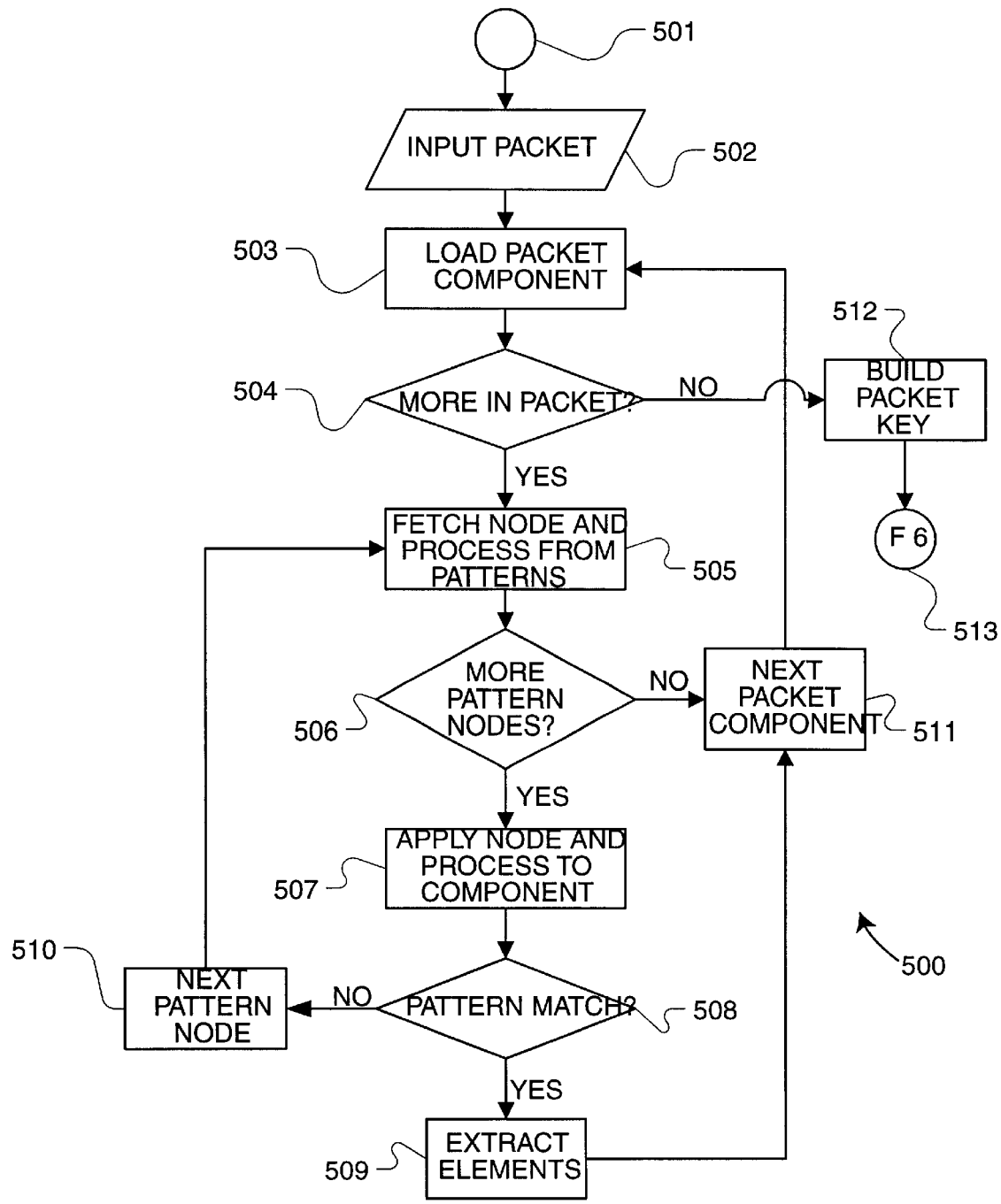
FIG. 5 is a flowchart of a packet parsing process used as part of the parser in an embodiment of the inventive packet monitor.

FIG. 5 shows a flowchart of how actual parser subsystem .301 functions. Starting at 501, the packet 302 is input to the packet buffer in step 502. Step 503 loads the next (initially the first) packet component from the packet 302. The packet components are extracted from each packet 302 one element at a time. A check is made (504) to determine if the load-packet-component operation 503 succeeded, indicating that there was more in the packet to process. If not, indicating all components have been loaded, the parser subsystem 301 builds the packet signature (512)—the next stage (FIG. 6).

If a component is successfully loaded in 503, the node and processes are fetched (505) from the pattern, parse and extraction database 308 to provide a set of patterns and processes for that node to apply to the loaded packet component. The parser subsystem 301 checks (506) to determine if the fetch pattern node operation 505 completed successfully, indicating there was a pattern node that loaded in 505. If not, step 511 moves to the next packet component. If yes, then the node and pattern matching process are applied in 507 to the component extracted in 503. A pattern match obtained in 507 (as indicated by test 508) means the parser subsystem 301 has found a node in the parsing elements; the parser subsystem 301 proceeds to step 509 to extract the elements.

If applying the node process to the component does not produce a match (test 508), the parser subsystem 301 moves (510) to the next pattern node from the pattern database 308 and to step 505 to fetch the next node and process. Thus, there is an "applying patterns" loop between 508 and 505. Once the parser subsystem 301 completes all the patterns and has either matched or not, the parser subsystem 301 moves to the next packet component (511).

Figure 6:
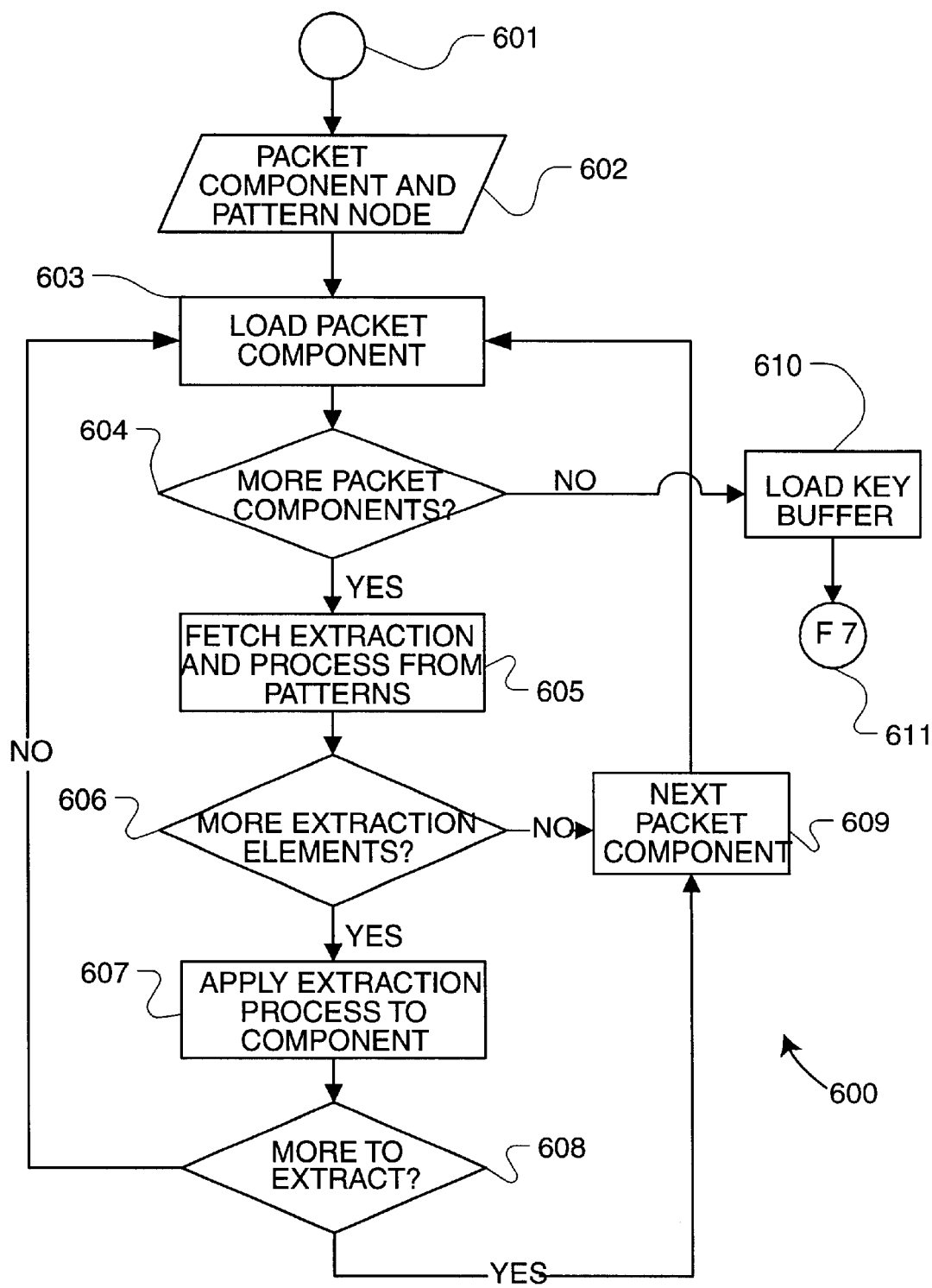
FIG. 6 is a flowchart of a packet element extraction process that is used as part of the parser in an embodiment of the inventive packet monitor.

Once all the packet components have been the loaded and processed from the input packet 302, then the load packet will fail (indicated by test 504), and the parser subsystem 301 moves to build a packet signature which is described in FIG. 6 FIG. 6 is a flow chart for extracting the information from which to build the packet signature. The flow starts at 601, which is the exit point 513 of FIG. 5. At this point parser subsystem 301 has a completed packet component and a pattern node available in a buffer (602). Step 603 loads the packet component available from the pattern analysis process of FIG. 5. If the load completed (test 604), indicating that there was indeed another packet component, the parser subsystem 301 fetches in 605 the extraction and process elements received from the pattern node component in 602. If the fetch was successful (test 606), indicating that there are extraction elements to apply, the parser subsystem 301 in step 607 applies that extraction process to the packet component based on an extraction instruction received from that pattern node. This removes and saves an element from the packet component.

In step 608, the parser subsystem 301 checks if there is more to extract from this component, and if not, the parser subsystem 301 moves back to 603 to load the next packet component at hand and repeats the process. If the answer is yes, then the parser subsystem 301 moves to the next packet component ratchet. That new packet component is then loaded in step 603. As the parser subsystem 301 moved through the loop between 608 and 603, extra extraction processes are applied either to the same packet component if there is more to extract, or to a different packet component if there is no more to extract.

The extraction process thus builds the signature, extracting more and more components according to the information in the patterns and extraction database 308 for the particular packet. Once loading the next packet component operation 603 fails (test 604), all the components have been extracted. The built signature is loaded into the signature buffer (610) and the parser subsystem 301 proceeds to FIG. 7 to complete the signature generation process.

Figure 7:
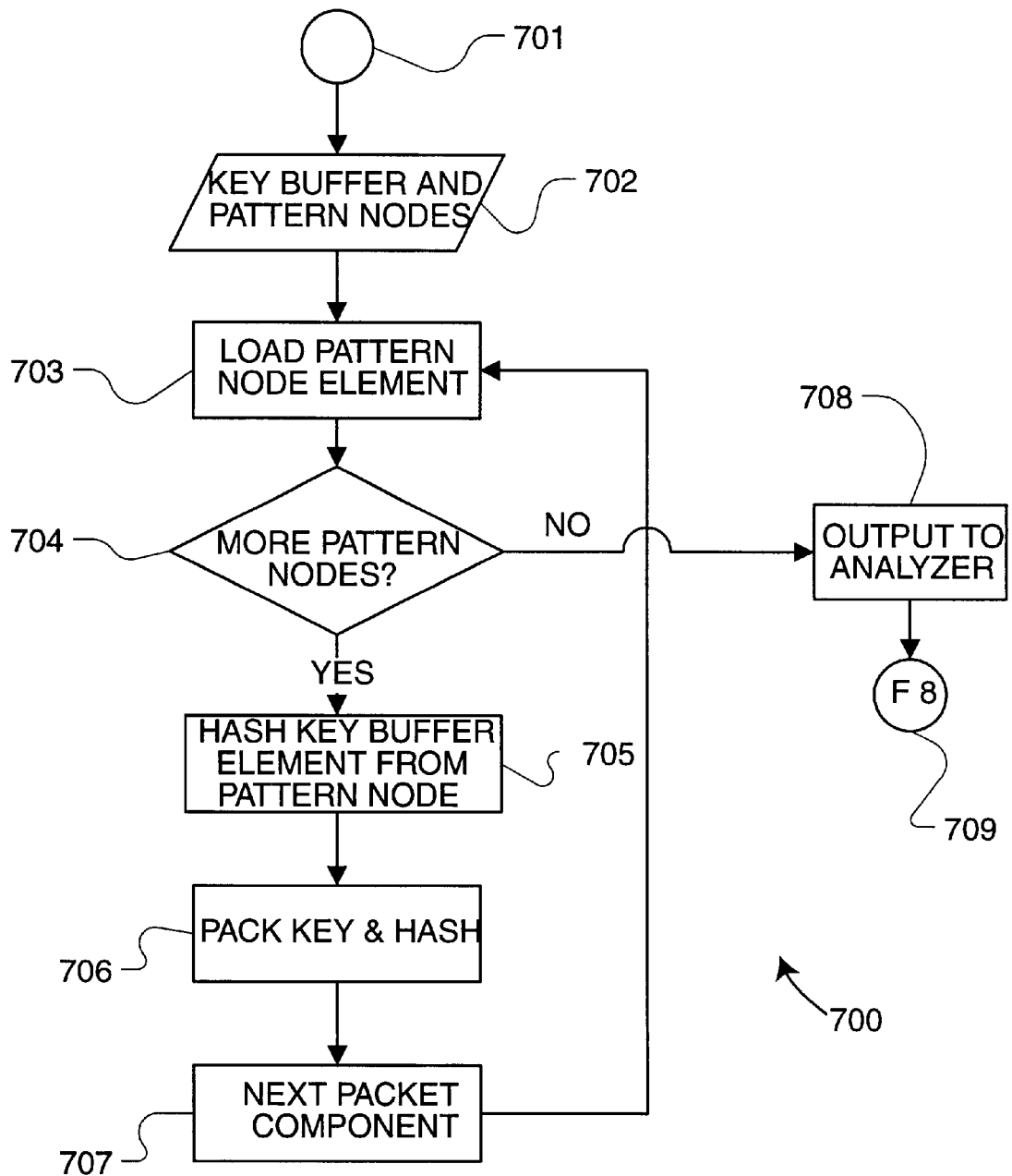
FIG. 7 is a flowchart of a flow-signature building process that is used as part of the parser in the inventive packet monitor.

Referring now to FIG. 7, the process continues at 701. The signature buffer and the pattern node elements are available (702). The parser subsystem 301 loads the next pattern node element. If the load was successful (test 704) indicating there are more nodes, the parser subsystem 301 in 705 hashes the signature buffer element based on the hash elements that are found in the pattern node that is in the element database. In 706 the resulting signature and the hash are packed. In 707 the parser subsystem 301 moves on to the next packet component which is loaded in 703.

The 703 to 707 loop continues until there are no more patterns of elements left (test 704). Once all the patterns of elements have been hashed, processes 304, 306 and 312 of parser subsystem 301 are complete. Parser subsystem 301 has generated the signature used by the analyzer subsystem 303.

A parser record is loaded into the analyzer, in particular, into the UFKB in the form of a UFKB record which is similar to a parser record, but with one or more different fields.

Figure 8:
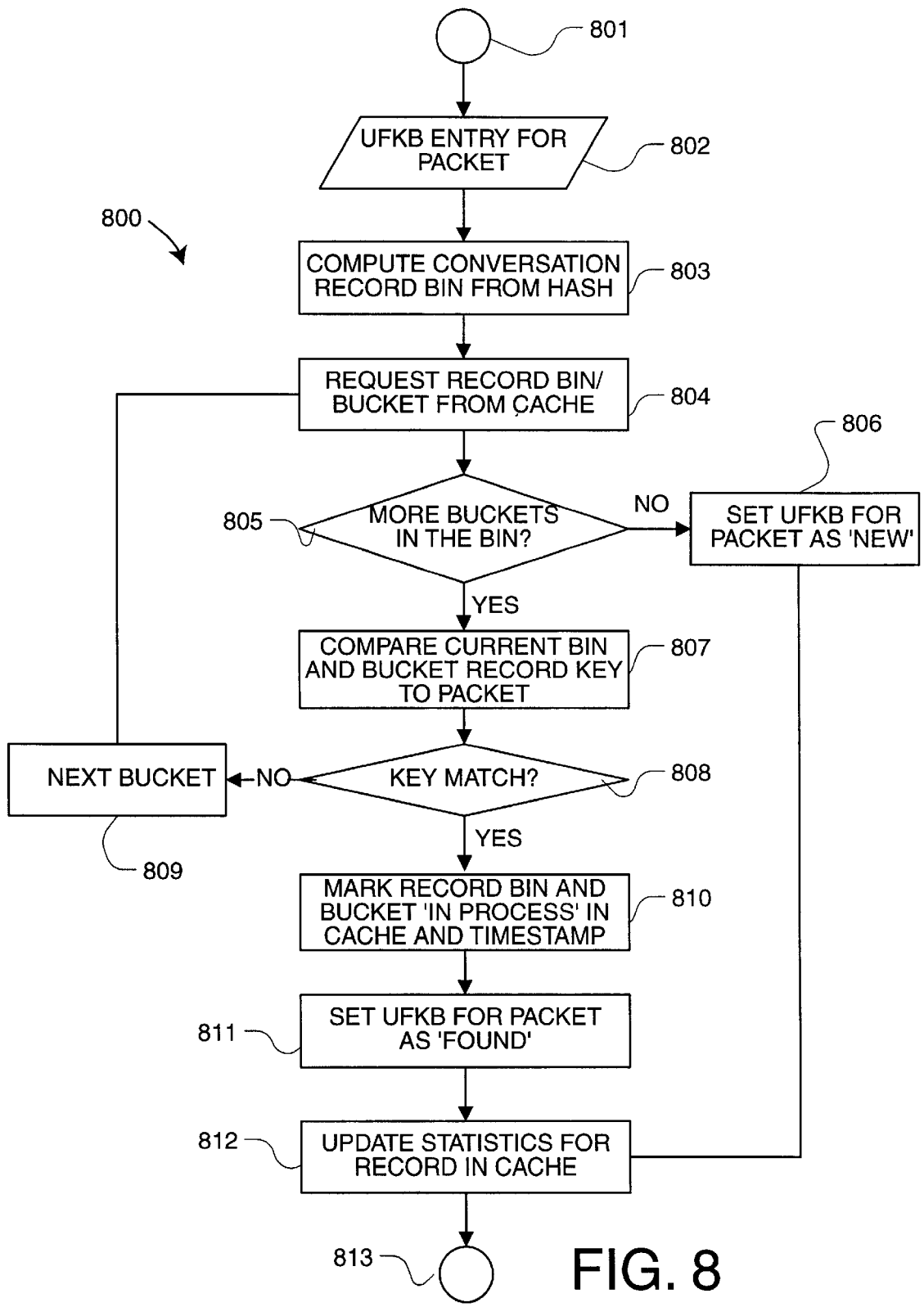
FIG. 8 is a flowchart of a monitor lookup and update process that is used as part of the analyzer in an embodiment of the inventive packet monitor.

FIG. 8 is a flow diagram describing the operation of the lookup/update engine (LUE) that implements lookup operation 314. The process starts at 801 from FIG. 7 with the parser record that includes a signature, the hash and at least parts of the payload. In 802 those elements are shown in the form of a UFKB-entry in the buffer. The LUE, the lookup engine 314 computes a "record bin number" from the hash for a flow-entry. A bin herein may have one or more "buckets" each containing a flow-entry. The preferred embodiment has four buckets per bin.

Since preferred hardware embodiment includes the cache, all data accesses to records in the flowchart of FIG. 8 are stated as being to or from the cache.

Thus, in 804, the system looks up the cache for a bucket from that bin using the hash. If the cache successfully returns with a bucket from the bin number, indicating there are more buckets in the bin, the lookup/update engine compares (807) the current signature (the UFKB-entry's signature) from that in the bucket (i.e., the flow-entry signature). If the signatures match (test 808), that record (in the cache) is marked in step 810 as "in process" and a timestamp added. Step 811 indicates to the UFKB that the UFKB-entry in 802 has a status of "found." The "found" indication allows the state processing 328 to begin processing this UFKB element. The preferred hardware embodiment includes one or more state processors, and these can operate in parallel with the lookup/update engine.

In the preferred embodiment, a set of statistical operations is performed by a calculator for every packet analyzed. The statistical operations may include one or more of counting the packets associated with the flow; determining statistics related to the size of packets of the flow; compiling statistics on differences between packets in each direction, for example using timestamps; and determining statistical relationships of timestamps of packets in the same direction. The statistical measures are kept in the flow-entries. Other statistical measures also may be compiled. These statistics may be used singly or in combination by a statistical processor component to analyze many different aspects of the flow. This may include determining network usage metrics from the statistical measures, for example to ascertain the network's ability to transfer information for this application. Such analysis provides for measuring the quality of service of a conversation, measuring how well an application is performing in the network, measuring network resources consumed by an application, and so forth.

To provide for such analyses, the lookup/update engine updates one or more counters that are part of the flow-entry (in the cache) in step 812. The process exits at 813. In our embodiment, the counters include the total packets of the flow, the time, and a differential time from the last timestamp to the present timestamp.

It may be that the bucket of the bin did not lead to a signature match (test 808). In such a case, the analyzer in 809 moves to the next bucket for this bin. Step 804 again looks up the cache for another bucket from that bin. The lookup/update engine thus continues lookup up buckets of the bin until there is either a match in 808 or operation 804 is not successful (test 805), indicating that there are no more buckets in the bin and no match was found.

If no match was found, the packet belongs to a new (not previously encountered) flow. In 806 the system indicates that the record in the unified flow key buffer for this packet is new, and in 812, any statistical updating operations are performed for this packet by updating the flow-entry in the cache. The update operation exits at 813. A flow insertion/deletion engine (FIDE) creates a new record for this flow (again via the cache).

Thus, the update/lookup engine ends with a UFKB-entry for the packet with a "new" status or a "found" status.

Note that the above system uses a hash to which more than one flow-entry can match. A longer hash may be used that corresponds to a single flow-entry. In such an embodiment, the flow chart of FIG. 8 is simplified as would be clear to those in the art.

The Hardware System

Figure 14:
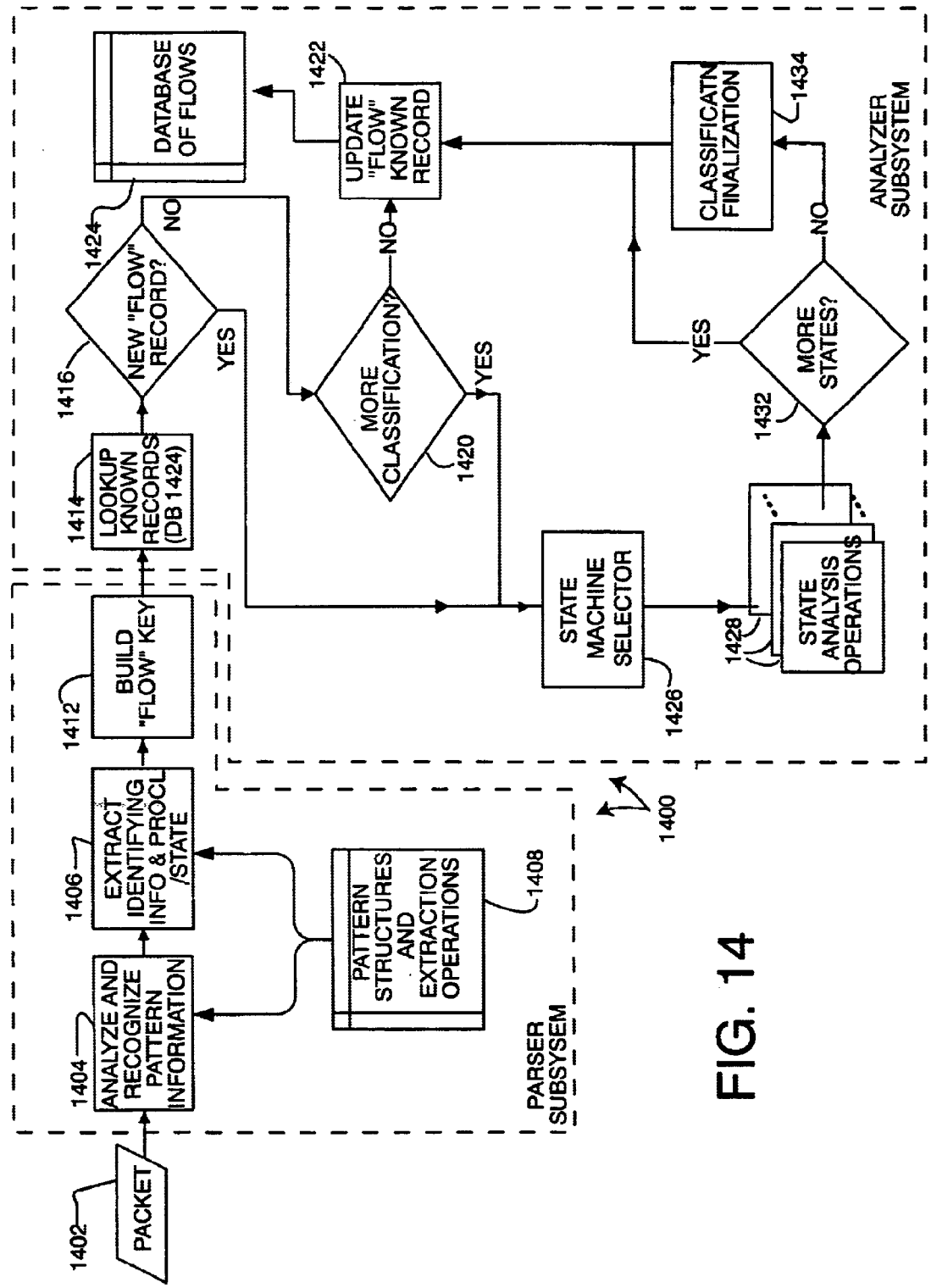
FIG. 14 is a simple functional block diagram of a process embodiment of the present invention that can operate as the packet monitor shown in FIG. 1. This process may be implemented in software.

Each of the individual hardware elements through which the data flows in the system are now described with reference to FIGS. 10 and 11. Note that while we are describing a particular hardware implementation of the invention embodiment of FIG. 3, it would be clear to one skilled in the art that the flow of FIG. 3 may alternatively be implemented in software running on one or more general-purpose processors, or only partly implemented in hardware. An implementation of the invention that can operate in software is shown in FIG. 14. The hardware embodiment (FIGS. 10 and 11) can operate at over a million packets per second, while the software system of FIG. 14 may be suitable for slower networks. To one skilled in the art it would be clear that more and more of the system may be implemented in software as processors become faster.

Figure 10:
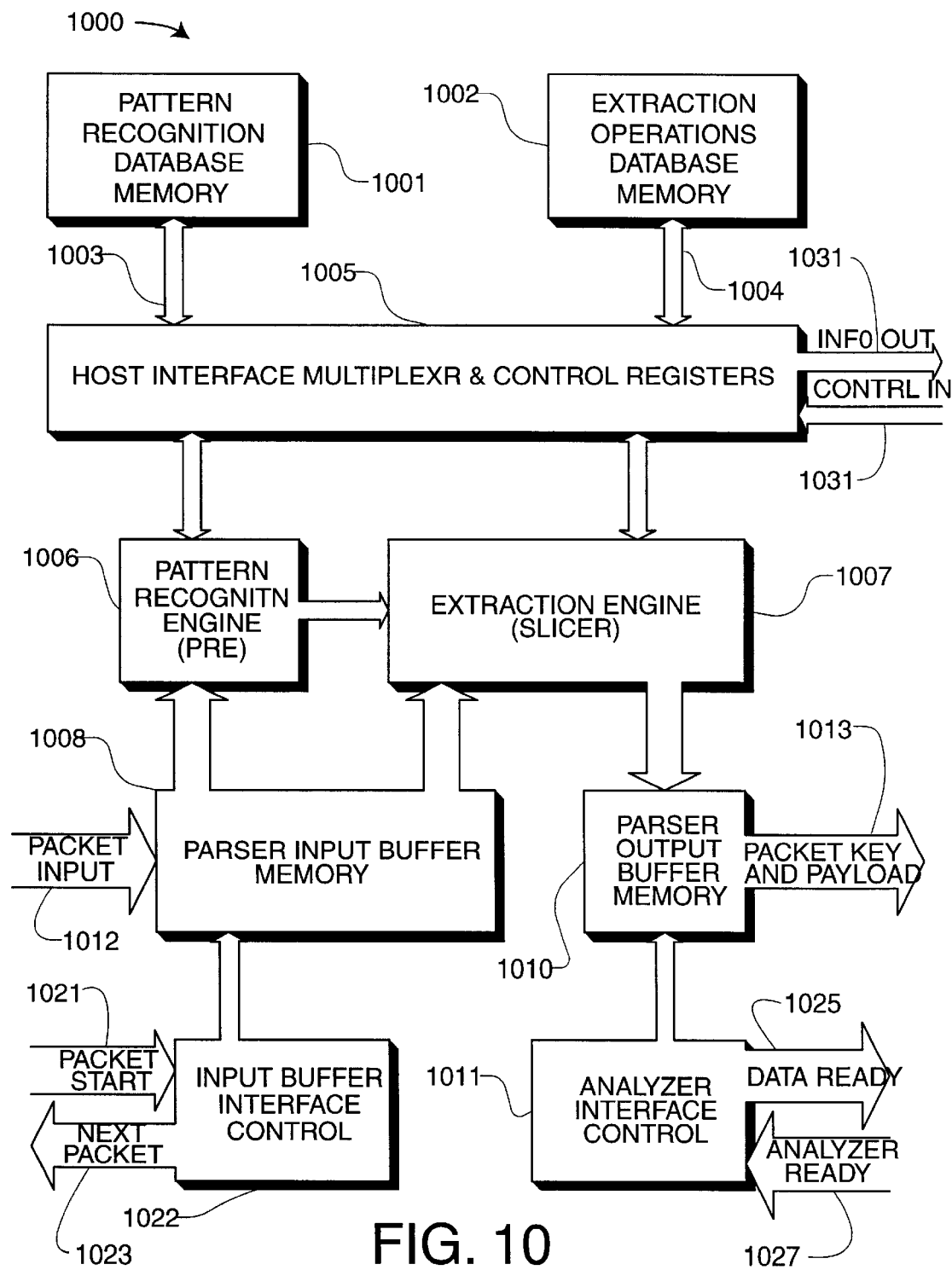
FIG. 10 is a functional block diagram of a hardware parser subsystem including the pattern recognizer and extractor that can form part of the parser module in an embodiment of the inventive packet monitor.

FIG. 10 is a description of the parsing subsystem (301, shown here as subsystem 1000) as implemented in hardware. Memory 1001 is the pattern recognition database memory, in which the patterns that are going to be analyzed are stored. Memory 1002 is the extraction-operation database memory, in which the extraction instructions are stored. Both 1001 and 1002 correspond to internal data structure 308 of FIG. 3. Typically, the system is initialized from a microprocessor (not shown) at which time these memories are loaded through a host interface multiplexor and control register 1005 via the internal buses 1003 and 1004. Note that the contents of 1001 and 1002 are preferably obtained by compiling process 310 of FIG. 3.

A packet enters the parsing system via 1012 into a parser input buffer memory 1008 using control signals 1021 and 1023, which control an input buffer interface controller 1022. The buffer 1008 and interface control 1022 connect to a packet acquisition device (not shown). The buffer acquisition device generates a packet start signal 1021 and the interface control 1022 generates a next packet (i.e., ready to receive data) signal 1023 to control the data flow into parser input buffer memory 1008. Once a packet starts loading into the buffer memory 1008, pattern recognition engine (PRE) 1006 carries out the operations on the input buffer memory described in block 304 of FIG. 3. That is, protocol types and associated headers for each protocol layer that exist in the packet are determined.

The PRE searches database 1001 and the packet in buffer 1008 in order to recognize the protocols the packet contains. In one implementation, the database 1001 includes a series of linked lookup tables. Each lookup table uses eight bits of addressing. The first lookup table is always at address zero. The Pattern Recognition Engine uses a base packet offset from a control register to start the comparison. It loads this value into a current offset pointer (COP). It then reads the byte at base packet offset from the parser input buffer and uses it as an address into the first lookup table.

Each lookup table returns a word that links to another lookup table or it returns a terminal flag. If the lookup produces a recognition event the database also returns a command for the slicer. Finally it returns the value to add to the COP.

The PRE 1006 includes of a comparison engine. The comparison engine has a first stage that checks the protocol type field to determine if it is an 802.3 packet and the field should be treated as a length. If it is not a length, the protocol is checked in a second stage. The first stage is the only protocol level that is not programmable. The second stage has two full sixteen bit content addressable memories (CAMs) defined for future protocol additions.

Thus, whenever the PRE recognizes a pattern, it also generates a command for the extraction engine (also called a "slicer") 1007. The recognized patterns and the commands are sent to the extraction engine 1007 that extracts information from the packet to build the parser record. Thus, the operations of the extraction engine are those carried out in blocks 306 and 312 of FIG. 3. The commands are sent from PRE 1006 to slicer 1007 in the form of extraction instruction pointers which tell the extraction engine 1007 where to a find the instructions in the extraction operations database memory (i.e., slicer instruction database) 1002.

Thus, when the PRE 1006 recognizes a protocol it outputs both the protocol identifier and a process code to the extractor. The protocol identifier is added to the flow signature and the process code is used to fetch the first instruction from the instruction database 1002. Instructions include an operation code and usually source and destination offsets as well as a length. The offsets and length are in bytes. A typical operation is the MOVE instruction. This instruction tells the slicer 1007 to copy n bytes of data unmodified from the input buffer 1008 to the output buffer 1010. The extractor contains a byte-wise barrel shifter so that the bytes moved can be packed into the flow signature. The extractor contains another instruction called HASH. This instruction tells the extractor to copy from the input buffer 1008 to the HASH generator.

Thus these instructions are for extracting selected element (s) of the packet in the input buffer memory and transferring the data to a parser output buffer memory 1010. Some instructions also generate a hash.

The extraction engine 1007 and the PRE operate as a pipeline. That is, extraction engine 1007 performs extraction operations on data in input buffer 1008 already processed by PRE 1006 while more (i.e., later arriving) packet information is being simultaneously parsed by PRE 1006. This provides high processing speed sufficient to accommodate the high arrival rate speed of packets.

Once all the selected parts of the packet used to form the signature are extracted, the hash is loaded into parser output buffer memory 1010. Any additional payload from the packet that is required for further analysis is also included. The parser output memory 1010 is interfaced with the analyzer subsystem by analyzer interface control 1011. Once all the information of a packet is in the parser output buffer memory 1010, a data ready signal 1025 is asserted by analyzer interface control. The data from the parser subsystem 1000 is moved to the analyzer subsystem via 1013 when an analyzer ready signal 1027 is asserted.

Figure 11:
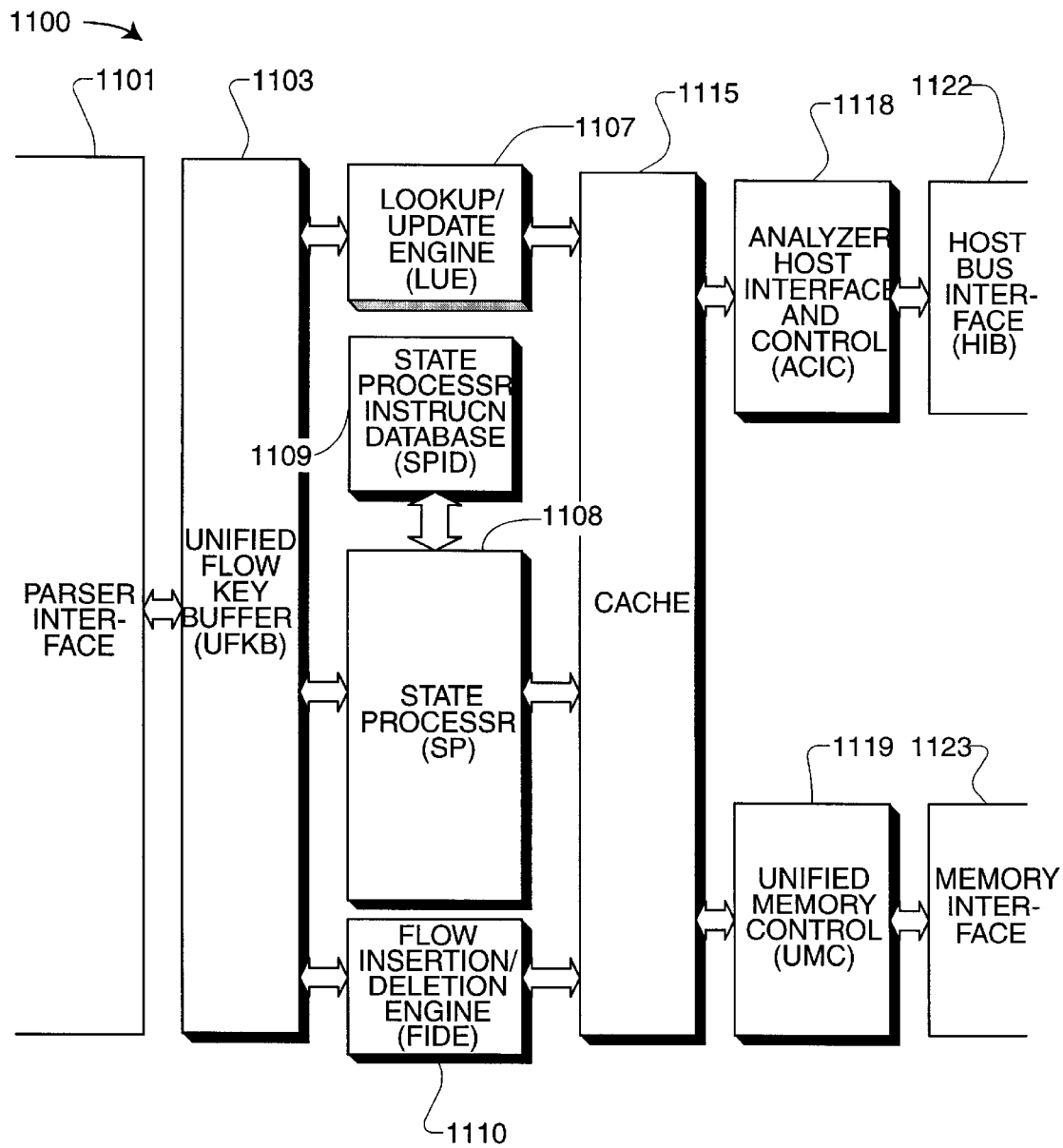
FIG. 11 is a functional block diagram of a hardware analyzer including a state processor that can form part of an embodiment of the inventive packet monitor.

FIG. 11 shows the hardware components and dataflow for the analyzer subsystem that performs the functions of the analyzer subsystem 303 of FIG. 3. The analyzer is initialized prior to operation, and initialization includes loading the state processing information generated by the compilation process 310 into a database memory for the state processing, called state processor instruction database (SPID) memory 1109.

The analyzer subsystem 1100 includes a host bus interface 1122 using an analyzer host interface controller 1118, which in turn has access to a cache system 1115. The cache system has bi-directional access to and from the state processor of the system 1108. State processor 1 108 is responsible for initializing the state processor instruction database memory 1109 from information given over the host bus interface 1122.

With the SPID 1109 loaded, the analyzer subsystem 1100 receives parser records comprising packet signatures and payloads that come from the parser into the unified flow key buffer (UFKB) 1103. UFKB is comprised of memory set up to maintain UFKB records. A UFKB record is essentially a parser record; the UFKB holds records of packets that are to be processed or that are in process. Furthermore, the UFKB provides for one or more fields to act as modifiable status flags to allow different processes to run concurrently.

Three processing engines run concurrently and access records in the UFKB 1103: the lookup/update engine (LUE) 1107, the state processor (SP) 1108, and the flow insertion and deletion engine (FIDE) 1110. Each of these is implemented by one or more finite state machines (FSM's). There is bi-directional access between each of the finite state machines and the unified flow key buffer 1103. The UFKB record includes a field that stores the packet sequence number, and another that is filled with state information in the form of a program counter for the state processor 1108 that implements state processing 328. The status flags of the UFKB for any entry includes that the LUE is done and that the LUE is transferring processing of the entry to the state processor. The LUE done indicator is also used to indicate what the next entry is for the LUE. There also is provided a flag to indicate that the state processor is done with the current flow and to indicate what the next entry is for the state processor. There also is provided a flag to indicate the state processor is transferring processing of the UFKB-entry to the flow insertion and deletion engine.

A new UFKB record is first processed by the LUE 1107. A record that has been processed by the LUE 1107 may be processed by the state processor 1108, and a UFKB record data may be processed by the flow insertion/deletion engine 1110 after being processed by the state processor 1108 or only by the LUE. Whether or not a particular engine has been applied to any unified flow key buffer entry is determined by status fields set by the engines upon completion. In one embodiment, a status flag in the UFKB-entry indicates whether an entry is new or found. In other embodiments, the LUE issues a flag to pass the entry to the state processor for processing, and the required operations for a new record are included in the SP instructions.

Note that each UFKB-entry may not need to be processed by all three engines. Furthermore, some UFKB entries may need to be processed more than once by a particular engine.

Each of these three engines also has bi-directional access to a cache subsystem 1115 that includes a caching engine. Cache 1115 is designed to have information flowing in and out of it from five different points within the system: the three engines, external memory via a unified memory controller (UMC) 1119 and a memory interface 1123, and a microprocessor via analyzer host interface and control unit (ACIC) 1118 and host interface bus (HIB) 1122. The analyzer microprocessor (or dedicated logic processor) can thus directly insert or modify data in the cache.

The cache subsystem 1115 is an associative cache that includes a set of content addressable memory cells (CAMs) each including an address portion and a pointer portion pointing to the cache memory (e.g., RAM) containing the cached flow-entries. The CAMs are arranged as a stack ordered from a top CAM to a bottom CAM. The bottom CAM's pointer points to the least recently used (LRU) cache memory entry. Whenever there is a cache miss, the contents of cache memory pointed to by the bottom CAM are replaced by the flow-entry from the flow-entry database 324. This now becomes the most recently used entry, so the contents of the bottom CAM are moved to the top CAM and all CAM contents are shifted down. Thus, the cache is an associative cache with a true LRU replacement policy.

The LUE 1107 first processes a UFKB-entry, and basically performs the operation of blocks 314 and 316 in FIG. 3. A signal is provided to the LUE to indicate that a "new" UFKB-entry is available. The LUE uses the hash in the UFKB-entry to read a matching bin of up to four buckets from the cache. The cache system attempts to obtain the matching bin. If a matching bin is not in the cache, the cache 1115 makes the request to the UMC 1119 to bring in a matching bin from the external memory.

When a flow-entry is found using the hash, the LUE 1107 looks at each bucket and compares it using the signature to the signature of the UFKB-entry until there is a match or there are no more buckets.

If there is no match, or if the cache failed to provide a bin of flow-entries from the cache, a time stamp in set in the flow key of the UFKB record, a protocol identification and state determination is made using a table that was loaded by compilation process 310 during initialization, the status for the record is set to indicate the LUE has processed the record, and an indication is made that the UFKB-entry is ready to start state processing. The identification and state determination generates a protocol identifier which in the preferred embodiment is a "jump vector" for the state processor which is kept by the UFKB for this UFKB-entry and used by the state processor to start state processing for the particular protocol. For example, the jump vector jumps to the subroutine for processing the state.

If there was a match, indicating that the packet of the UFKB-entry is for a previously encountered flow, then a calculator component enters one or more statistical measures stored in the flow-entry, including the timestamp. In addition, a time difference from the last stored timestamp may be stored, and a packet count may be updated. The state of the flow is obtained from the flow-entry is examined by looking at the protocol identifier stored in the flow-entry of database 324. If that value indicates that no more classification is required, then the status for the record is set to indicate the LUE has processed the record. In the preferred embodiment, the protocol identifier is a jump vector for the state processor to a subroutine to state processing the protocol, and no more classification is indicated in the preferred embodiment by the jump vector being zero. If the protocol identifier indicates more processing, then an indication is made that the UFKB-entry is ready to start state processing and the status for the record is set to indicate the LUE has processed the record.

The state processor 1108 processes information in the cache system according to a UFKB-entry after the LUE has completed. State processor 1108 includes a state processor program counter SPPC that generates the address in the state processor instruction database 1109 loaded by compiler process 310 during initialization. It contains an Instruction Pointer (SPIP) which generates the SPID address. The instruction pointer can be incremented or loaded from a Jump Vector Multiplexor which facilitates conditional branching. The SPIP can be loaded from one of three sources: (1) A protocol identifier from the UFKB, (2) an immediate jump vector form the currently decoded instruction, or (3) a value provided by the arithmetic logic unit (SPALU) included in the state processor.

Thus, after a Flow Key is placed in the UFKB by the LUE with a known protocol identifier, the Program Counter is initialized with the last protocol recognized by the Parser. This first instruction is a jump to the subroutine which analyzes the protocol that was decoded.

The State Processor ALU (SPALU) contains all the Arithmetic, Logical and String Compare functions necessary to implement the State Processor instructions. The main blocks of the SPALU are: The A and B Registers, the Instruction Decode & State Machines, the String Reference Memory the Search Engine, an Output Data Register and an Output Control Register The Search Engine in turn contains the Target Search Register set, the Reference Search Register set, and a Compare block which compares two operands by exclusive-or-ing them together.

Thus, after the UFKB sets the program counter, a sequence of one or more state operations are be executed in state processor 1108 to further analyze the packet that is in the flow key buffer entry for this particular packet.

Figure 13:
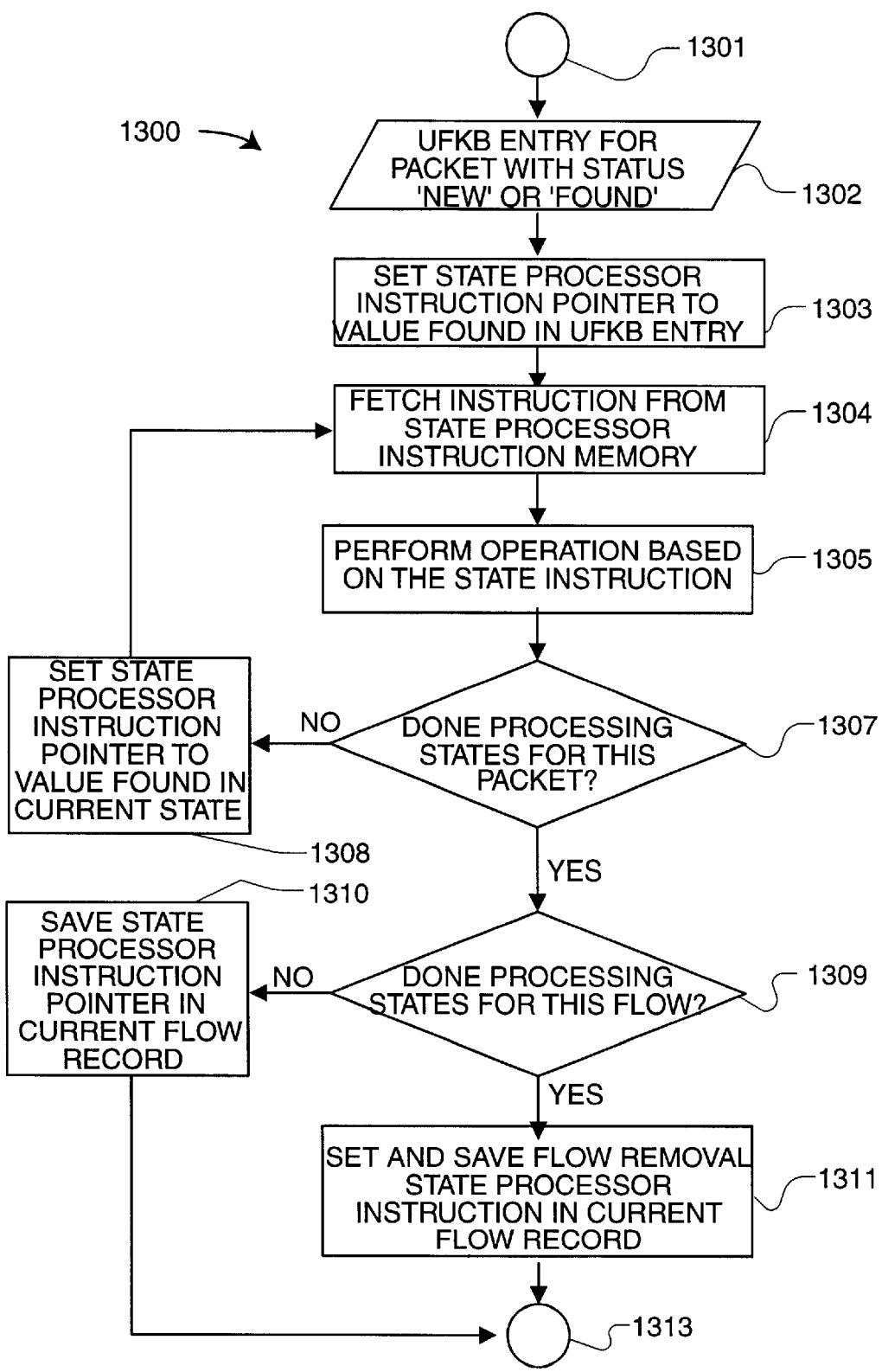
FIG. 13 is a flowchart of a state processing process that can form part of the analyzer in an embodiment of the inventive packet monitor.

FIG. 13 describes the operation of the state processor 1108. The state processor is entered at 1301 with a unified flow key buffer entry to be processed. The UFKB-entry is new or corresponding to a found flow-entry. This UFKB-entry is retrieved from unified flow key buffer 1103 in 1301. In 1303, the protocol identifier for the UFKB-entry is used to set the state processor's instruction counter. The state processor 1108 starts the process by using the last protocol recognized by the parser subsystem 301 as an offset into a jump table. The jump table takes us to the instructions to use for that protocol. Most instructions test something in the unified flow key buffer or the flow-entry if it exists. The state processor 1108 may have to test bits, do comparisons, add or subtract to perform the test.

The first state processor instruction is fetched in 1304 from the state processor instruction database memory 1109. The state processor performs the one or more fetched operations (1304). In our implementation, each single state processor instruction is very primitive (e.g., a move, a compare, etc.), so that many such instructions need to be performed on each unified flow key buffer entry. One aspect of the state processor is its ability to search for one or more (up to four) reference strings in the payload part of the UFKB entry. This is implemented by a search engine component of the state processor responsive to special searching instructions.

In 1307, a check is made to determine if there are any more instructions to be performed for the packet. If yes, then in 1308 the system sets the state processor instruction pointer (SPIP) to obtain the next instruction. The SPIP may be set by an immediate jump vector in the currently decoded instruction, or by a value provided by the SPALU during processing.

The next instruction to be performed is now fetched (1304) for execution. This state processing loop between 1304 and 1307 continues until there are no more instructions to be performed.

At this stage, a check is made in 1309 if the processing on this particular packet has resulted in a final state. That is, is the analyzer is done processing not only for this particular packet, but for the whole flow to which the packet belongs, and the flow is fully determined. If indeed there are no more states to process for this flow, then in 1311 the processor finalizes the processing. Some final states may need to put a state in place that tells the system to remove a flow—for example, if a connection disappears from a lower level connection identifier. In that case, in 1311, a flow removal state is set and saved in the flow-entry. The flow removal state may be a NOP (no-op) instruction which means there are no removal instructions.

Once the appropriate flow removal instruction as specified for this flow (a NOP or otherwise) is set and saved, the process is exited at 1313. The state processor 1108 can now obtain another unified flow key buffer entry to process.

If at 1309 it is determined that processing for this flow is not completed, then in 1310 the system saves the state processor instruction pointer in the current flow-entry in the current flow-entry. That will be the next operation that will be performed the next time the LRE 1107 finds packet in the UFKB that matches this flow. The processor now exits processing this particular unified flow key buffer entry at 1313.

Note that state processing updates information in the unified flow key buffer 1103 and the flow-entry in the cache. Once the state processor is done, a flag is set in the UFKB for the entry that the state processor is done. Furthermore, If the flow needs to be inserted or deleted from the database of flows, control is then passed on to the flow insertion/deletion engine 1110 for that flow signature and packet entry. This is done by the state processor setting another flag in the UFKB for this UFKB-entry indicating that the state processor is passing processing of this entry to the flow insertion and deletion engine.

The flow insertion and deletion engine 1110 is responsible for maintaining the flow-entry database. In particular, for creating new flows in the flow database, and deleting flows from the database so that they can be reused.

Figure 12:
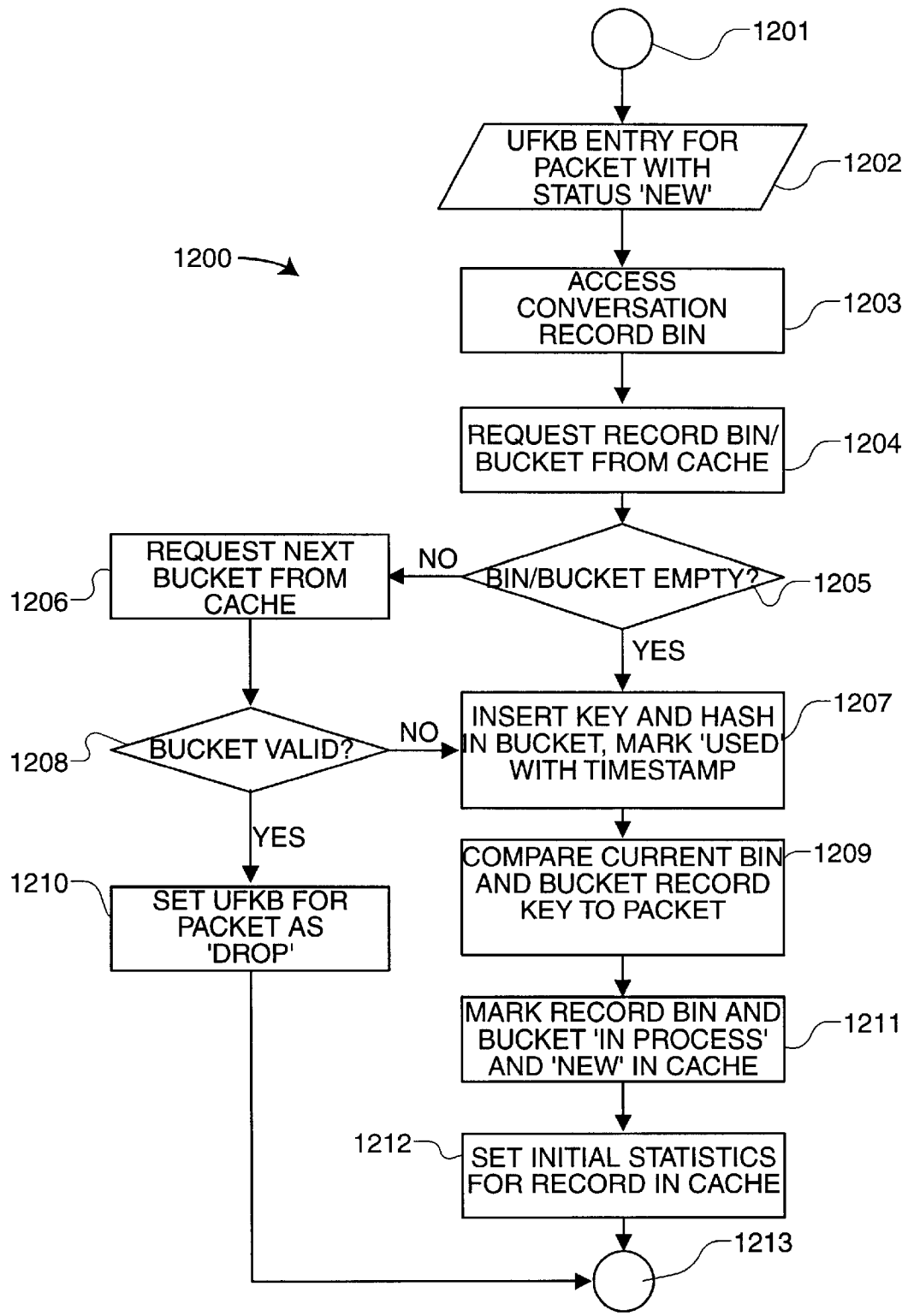
FIG. 12 is a functional block diagram of a flow insertion and deletion engine process that can form part of the analyzer in an embodiment of the inventive packet monitor.

The process of flow insertion is now described with the aid of FIG. 12. Flows are grouped into bins of buckets by the hash value. The engine processes a UFKB-entry that may be new or that the state processor otherwise has indicated needs to be created. FIG. 12 shows the case of a new entry being created. A conversation record bin (preferably containing 4 buckets for four records) is obtained in 1203. This is a bin that matches the hash of the UFKB, so this bin may already have been sought for the UFKB-entry by the LUE. In 1204 the FIDE 1110 requests that the record bin/bucket be maintained in the cache system 1115. If in 1205 the cache system 1115 indicates that the bin/bucket is empty, step 1207 inserts the flow signature (with the hash) into the bucket and the bucket is marked "used" in the cache engine of cache 1115 using a timestamp that is maintained throughout the process. In 1209, the FIDE 1110 compares the bin and bucket record flow signature to the packet to verify that all the elements are in place to complete the record. In 1211 the system marks the record bin and bucket as "in process" and as "new" in the cache system (and hence in the external memory). In 1212, the initial statistical measures for the flow-record are set in the cache system. This in the preferred embodiment clears the set of counters used to maintain statistics, and may perform other procedures for statistical operations requires by the analyzer for the first packet seen for a particular flow.

Back in step 1205, if the bucket is not empty, the FIDE 1110 requests the next bucket for this particular bin in the cache system. If this succeeds, the processes of 1207, 1209, 1211 and 1212 are repeated for this next bucket. If at 1208, there is no valid bucket, the unified flow key buffer entry for the packet is set as "drop," indicating that the system cannot process the particular packet because there are no buckets left in the system. The process exits at 1213. The FIDE 1110 indicates to the UFKB that the flow insertion and deletion operations are completed for this UFKB-entry. This also lets the UFKB provide the FIDE with the next UFKB record.

Once a set of operations is performed on a unified flow key buffer entry by all of the engines required to access and manage a particular packet and its flow signature, the unified flow key buffer entry is marked as "completed." That element will then be used by the parser interface for the next packet and flow signature coming in from the parsing and extracting system.

All flow-entries are maintained in the external memory and some are maintained in the cache 1115. The cache system 1115 is intelligent enough to access the flow database and to understand the data structures that exists on the other side of memory interface 1123. The lookup/update engine 1107 is able to request that the cache system pull a particular flow or "buckets" of flows from the unified memory controller 1119 into the cache system for further processing. The state processor 1108 can operate on information found in the cache system once it is looked up by means of the lookup/update engine request, and the flow insertion/deletion engine 1110 can create new entries in the cache system if required based on information in the unified flow key buffer 1103. The cache retrieves information as required from the memory through the memory interface 1123 and the unified memory controller 1119, and updates information as required in the memory through the memory controller 1119.

There are several interfaces to components of the system external to the module of FIG. 11 for the particular hardware implementation. These include host bus interface 1122, which is designed as a generic interface that can operate with any kind of external processing system such as a microprocessor or a multiplexor (MUX) system. Consequently, one can connect the overall traffic classification system of FIGS. 11 and 12 into some other processing system to manage the classification system and to extract data gathered by the system.

The memory interface 1123 is designed to interface to any of a variety of memory systems that one may want to use to store the flow-entries. One can use different types of memory systems like regular dynamic random access memory (DRAM), synchronous DRAM, synchronous graphic memory (SGRAM), static random access memory (SRAM), and so forth.

FIG. 10 also includes some "generic" interfaces. There is a packet input interface 1012—a general interface that works in tandem with the signals of the input buffer interface control 1022. These are designed so that they can be used with any kind of generic systems that can then feed packet information into the parser. Another generic interface is the interface of pipes 1031 and 1033 respectively out of and into host interface multiplexor and control registers 1005. This enables the parsing system to be managed by an external system, for example a microprocessor or another kind of external logic, and enables the external system to program and otherwise control the parser.

The preferred embodiment of this aspect of the invention is described in a hardware description language (HDL) such as VHDL or Verilog. It is designed and created in an HDL so that it may be used as a single chip system or, for instance, integrated into another general-purpose system that is being designed for purposes related to creating and analyzing traffic within a network. Verilog or other HDL implementation is only one method of describing the hardware.

In accordance with one hardware implementation, the elements shown in FIGS. 10 and 11 are implemented in a set of six field programmable logic arrays (FPGA's). The boundaries of these FPGA's are as follows. The parsing subsystem of FIG. 10 is implemented as two FPGAS; one FPGA, and includes blocks 1006, 1008 and 1012, parts of 1005, and memory 1001. The second FPGA includes 1002, 1007, 1013, 1011 parts of 1005. Referring to FIG. 11, the unified look-up buffer 1103 is implemented as a single FPGA. State processor 1108 and part of state processor instruction database memory 1109 is another FPGA. Portions of the state processor instruction database memory 1109 are maintained in external SRAM's. The lookup/update engine 1107 and the flow insertion/deletion engine 1110 are in another FPGA. The sixth FPGA includes the cache system 1115, the unified memory control 1119, and the analyzer host interface and control 1118.

Note that one can implement the system as one or more VSLI devices, rather than as a set of application specific integrated circuits (ASIC's) such as FPGA's. It is anticipated that in the future device densities will continue to increase, so that the complete system may eventually form a sub-unit (a "core") of a larger single chip unit.

Operation of the Invention

Figure 15:
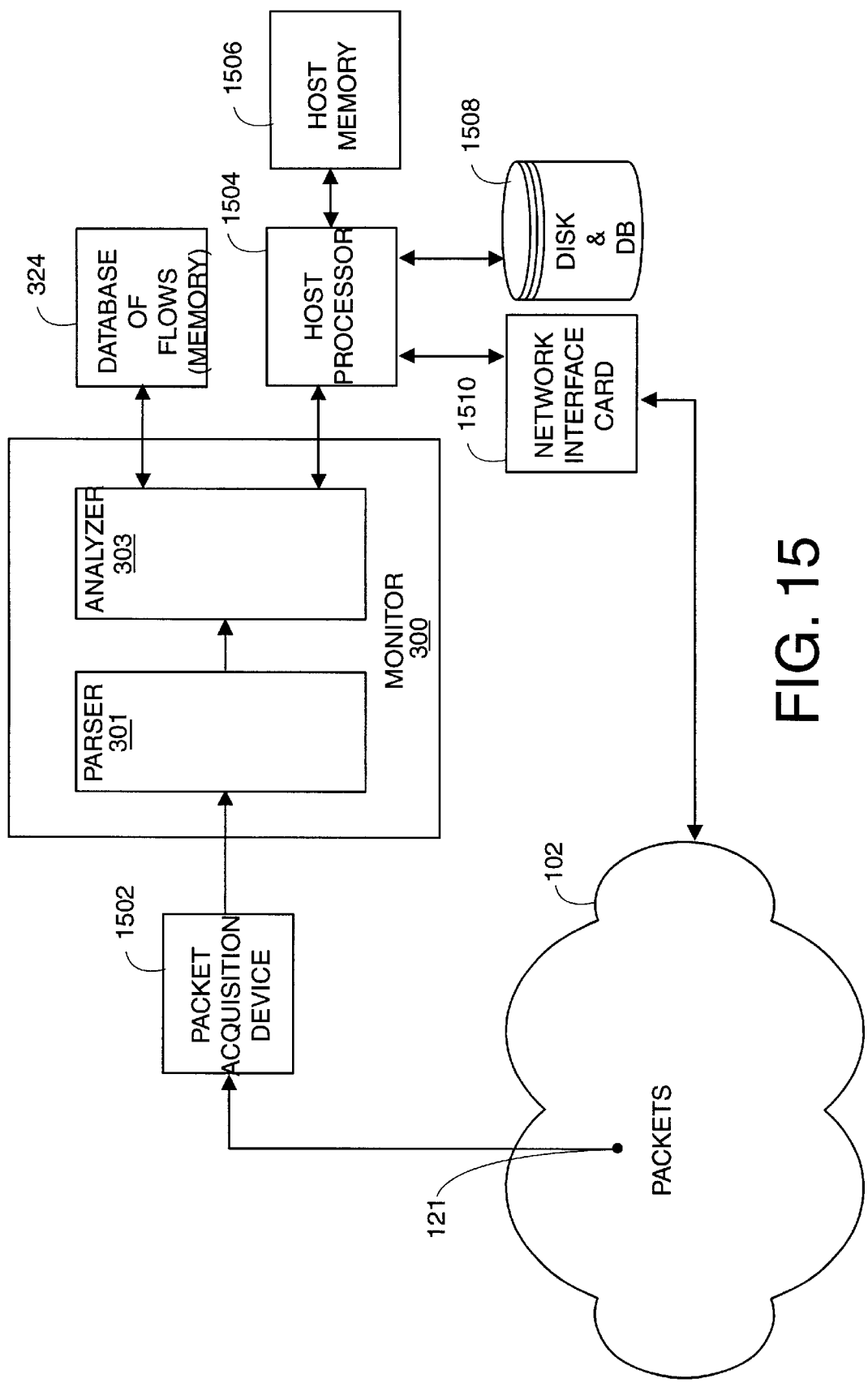
FIG. 15 is a functional block diagram of how the packet monitor of FIG. 3 (and FIGS. 10 and 11) may operate on a network with a processor such as a microprocessor.

FIG. 15 shows how an embodiment of the network monitor 300 might be used to analyze traffic in a network 102. Packet acquisition device 1502 acquires all the packets from a connection point 121 on network 102 so that all packets passing point 121 in either direction are supplied to monitor 300. Monitor 300 comprises the parser sub-system 301, which determines flow signatures, and analyzer sub-system 303 that analyzes the flow signature of each packet. A memory 324 is used to store the database of flows that are determined and updated by monitor 300. A host computer 1504, which might be any processor, for example, a general-purpose computer, is used to analyze the flows in memory 324. As is conventional, host computer 1504 includes a memory, say RAM, shown as host memory 1506. In addition, the host might contain a disk. In one application, the system can operate as an RMON probe, in which case the host computer is coupled to a network interface card 1510 that is connected to the network 102.

The preferred embodiment of the invention is supported by an optional Simple Network Management Protocol (SNMP) implementation. FIG. 15 describes how one would, for example, implement an RMON probe, where a network interface card is used to send RMON information to the network. Commercial SNMP implementations also are available, and using such an implementation can simplify the process of porting the preferred embodiment of the invention to any platform.

In addition, MIB Compilers are available. An MIB Compiler is a tool that greatly simplifies the creation and maintenance of proprietary MIB extensions.

Examples of Packet Elucidation

Monitor 300, and in particular, analyzer 303 is capable of carrying out state analysis for packet exchanges that are commonly referred to as "server announcement" type exchanges. Server announcement is a process used to ease communications between a server with multiple applications that can all be simultaneously accessed from multiple clients. Many applications use a server announcement process as a means of multiplexing a single port or socket into many applications and services. With this type of exchange, messages are sent on the network, in either a broadcast or multicast approach, to announce a server and application, and all stations in the network may receive and decode these messages. The messages enable the stations to derive the appropriate connection point for communicating that particular application with the particular server. Using the server announcement method, a particular application communicates using a service channel, in the form of a TCP or UDP socket or port as in the IP protocol suite, or using a SAP as in the Novell IPX protocol suite.

The analyzer 303 is also capable of carrying out "in-stream analysis" of packet exchanges. The "in-stream analysis" method is used either as a primary or secondary recognition process. As a primary process, in-stream analysis assists in extracting detailed information which will be used to further recognize both the specific application and application component. A good example of in-stream analysis is any Web-based application. For example, the commonly used PointCast Web information application can be recognized using this process; during the initial connection between a PointCast server and client, specific key tokens exist in the data exchange that will result in a signature being generated to recognize PointCast.

The in-stream analysis process may also be combined with the server announcement process. In many cases in-stream analysis will augment other recognition processes. An example of combining in-stream analysis with server announcement can be found in business applications such as SAP and BAAN.

"Session tracking" also is known as one of the primary processes for tracking applications in client/server packet exchanges. The process of tracking sessions requires an initial connection to a predefined socket or port number. This method of communication is used in a variety of transport layer protocols. It is most commonly seen in the TCP and UDP transport protocols of the IP protocol.

During the session tracking, a client makes a request to a server using a specific port or socket number. This initial request will cause the server to create a TCP or UDP port to exchange the remainder of the data between the client and the server. The server then replies to the request of the client using this newly created port. The original port used by the client to connect to the server will never be used again during this data exchange.

One example of session tracking is TFTP (Trivial File Transfer Protocol), a version of the TCP/IP FTP protocol that has no directory or password capability. During the client/server exchange process of TFTP, a specific port (port number 69) is always used to initiate the packet exchange. Thus, when the client begins the process of communicating, a request is made to UDP port 69. Once the server receives this request, a new port number is created on the server. The server then replies to the client using the new port. In this example, it is clear that in order to recognize TFTP; network monitor 300 analyzes the initial request from the client and generates a signature for it. Monitor 300 uses that signature to recognize the reply. Monitor 300 also analyzes the reply from the server with the key port information, and uses this to create a signature for monitoring the remaining packets of this data exchange.

Network monitor 300 can also understand the current state of particular connections in the network. Connection-oriented exchanges often benefit from state tracking to correctly identify the application. An example is the common TCP transport protocol that provides a reliable means of sending information between a client and a server. When a data exchange is initiated, a TCP request for synchronization message is sent. This message contains a specific sequence number that is used to track an acknowledgement from the server. Once the server has acknowledged the synchronization request, data may be exchanged between the client and the server. When communication is no longer required, the client sends a finish or complete message to the server, and the server acknowledges this finish request with a reply containing the sequence numbers from the request. The states of such a connection-oriented exchange relate to the various types of connection and maintenance messages.

Server Announcement Example

The individual methods of server announcement protocols vary. However, the basic underlying process remains similar. A typical server announcement message is sent to one or more clients in a network. This type of announcement message has specific content, which, in another aspect of the invention, is salvaged and maintained in the database of flow-entries in the system. Because the announcement is sent to one or more stations, the client involved in a future packet exchange with the server will make an assumption that the information announced is known, and an aspect of the inventive monitor is that it too can make the same assumption.

Sun-RPC is the implementation by Sun Microsystems, Inc. (Palo Alto, Calif.) of the Remote Procedure Call (RPC), a programming interface that allows one program to use the services of another on a remote machine. A Sun-RPC example is now used to explain how monitor 300 can capture server announcements.

A remote program or client that wishes to use a server or procedure must establish a connection, for which the RPC protocol can be used.

Each server running the Sun-RPC protocol must maintain a process and database called the port Mapper. The port Mapper creates a direct association between a Sun-RPC program or application and a TCP or UDP socket or port (for TCP or UDP implementations). An application or program number is a 32-bit unique identifier assigned by ICANN (the Internet Corporation for Assigned Names and Numbers, www.icann.org), which manages the huge number of parameters associated with Internet protocols (port numbers, router protocols, multicast addresses, etc.) Each port Mapper on a Sun-RPC server can present the mappings between a unique program number and a specific transport socket through the use of specific request or a directed announcement. According to ICANN, port number 111 is associated with Sun RPC.

As an example, consider a client (e.g., CLIENT 3 shown as 106 in FIG. 1) making a specific request to the server (e.g., SERVER 2 of FIG. 1, shown as 110) on a predefined UDP or TCP socket. Once the port Mapper process on the sun RPC server receives the request, the specific mapping is returned in a directed reply to the client.

1. A client (CLIENT 3, 106 in FIG. 1) sends a TCP packet to SERVER 2 (110 in FIG. 1) on port 111, with an RPC Bind Lookup Request (rpcBindLookup). TCP or UDP port 111 is always associated Sun RPC. This request specifies the program (as a program identifier), version, and might specify the protocol (UDP or TCP).

2. The server SERVER 2 (110 in FIG. 1) extracts the program identifier and version identifier from the request. The server also uses the fact that this packet came in using the TCP transport and that no protocol was specified, and thus will use the TCP protocol for its reply.

3. The server 110 sends a TCP packet to port number 111, with an RPC Bind Lookup Reply. The reply contains the specific port number (e.g., port number 'port') on which future transactions will be accepted for the specific RPC program identifier (e.g., Program 'program') and the protocol (UDP or TCP) for use.

It is desired that from now on every time that port number 'port' is used, the packet is associated with the application program 'program' until the number 'port' no longer is to be associated with the program 'program'. Network monitor 300 by creating a flow-entry and a signature includes a mechanism for remembering the exchange so that future packets that use the port number 'port' will be associated by the network monitor with the application program 'program'.

In addition to the Sun RPC Bind Lookup request and reply, there are other ways that a particular program—say 'program'—might be associated with a particular port number, for example number 'port'. One is by a broadcast announcement of a particular association between an application service and a port number, called a Sun RPC portMapper Announcement. Another, is when some server-say the same SERVER 2—replies to some client—say CLIENT 1—requesting some portMapper assignment with a RPC portMapper Reply. Some other client—say CLIENT 2—might inadvertently see this request, and thus know that for this particular server, SERVER 2, port number 'port' is associated with the application service 'program'. It is desirable for the network monitor 300 to be able to associate any packets to SERVER 2 using port number 'port' with the application program 'program'.

Figure 9:
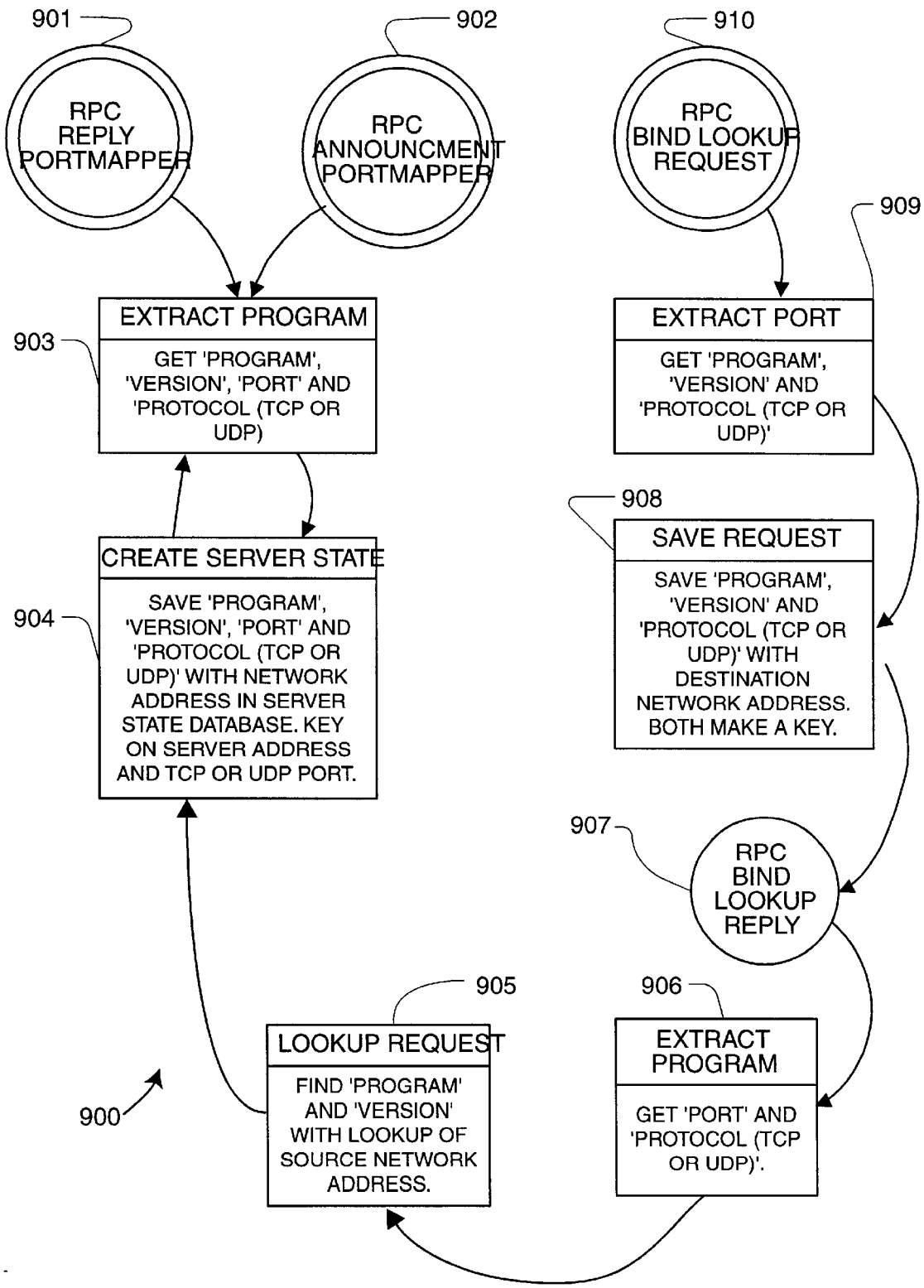
FIG. 9 is a flowchart of an exemplary Sun Microsystems Remote Procedure Call application than may be recognized by the inventive packet monitor.

FIG. 9 represents a dataflow 900 of some operations in the monitor 300 of FIG. 3 for Sun Remote Procedure Call. Suppose a client 106 (e.g., CLIENT 3 in FIG. 1) is communicating via its interface to the network 118 to a server 110 (e.g., SERVER 2 in FIG. 1) via the server's interface to the network 116. Further assume that Remote Procedure Call is used to communicate with the server 110. One path in the data flow 900 starts with a step 910 that a Remote Procedure Call bind lookup request is issued by client 106 and ends with the server state creation step 904. Such RPC bind lookup request includes values for the 'program,' 'version,' and 'protocol' to use, e.g., TCP or UDP. The process for Sun RPC analysis in the network monitor 300 includes the following aspects.:

Process 909:Extract the 'program,' 'version,' and 'protocol' (UDP or TCP). Extract the TCP or UDP port (process 909) which is 111 indicating Sun RPC.

Process 908:Decode the Sun RPC packet. Check RPC type field for ID. If value is portMapper, save paired socket (i.e., dest for destination address, src for source address). Decode ports and mapping, save ports with socket/addr key. There may be more than one pairing per mapper packet. Form a signature (e.g., a key). A flow-entry is created in database 324. The saving of the request is now complete.

At some later time, the server (process 907) issues a RPC bind lookup reply. The packet monitor 300 will extract a signature from the packet and recognize it from the previously stored flow. The monitor will get the protocol port number (906) and lookup the request (905). A new signature (i.e., a key) will be created and the creation of the server state (904) will be stored as an entry identified by the new signature in the flow-entry database. That signature now may be used to identify packets associated with the server.

The server state creation step 904 can be reached not only from a Bind Lookup Request/Reply pair, but also from a RPC Reply portMapper packet shown as 901 or an RPC Announcement portMapper shown as 902. The Remote Procedure Call protocol can announce that it is able to provide a particular application service. Embodiments of the present invention preferably can analyze when an exchange occurs between a client and a server, and also can track those stations that have received the announcement of a service in the network.

The RPC Announcement portMapper announcement 902 is a broadcast. Such causes various clients to execute a similar set of operations, for example, saving the information obtained from the announcement. The RPC Reply portMapper step 901 could be in reply to a portMapper request, and is also broadcast. It includes all the service parameters.

Thus monitor 300 creates and saves all such states for later classification of flows that relate to the particular service 'program'.

Figure 2:
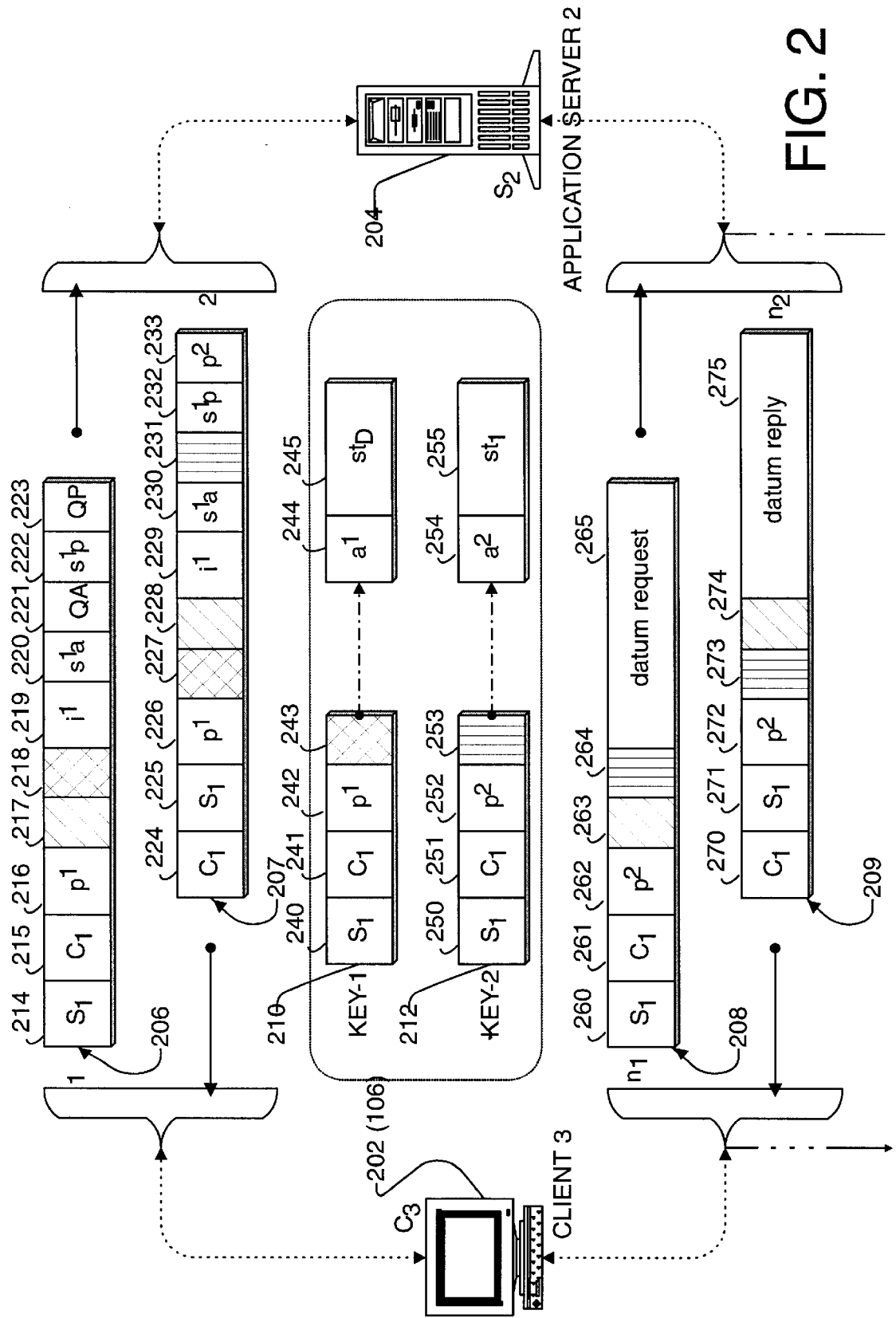
FIG. 2 is a diagram representing an example of some of the packets and their formats that might be exchanged in starting, as an illustrative example, a conversational flow between a client and server on a network being monitored and analyzed. A pair of flow signatures particular to this example and to embodiments of the present invention is also illustrated. This represents some of the possible flow signatures that can be generated and used in the process of analyzing packets and of recognizing the particular server applications that produce the discrete application packet exchanges.

FIG. 2 shows how the monitor 300 in the example of Sun RPC builds a signature and flow states. A plurality of packets 206–209 are exchanged, e.g., in an exemplary Sun Microsystems Remote Procedure Call protocol. A method embodiment of the present invention might generate a pair of flow signatures, "signature-1" 210 and "signature-2" 212, from information found in the packets 206 and 207 which, in the example, correspond to a Sun RPC Bind Lookup request and reply, respectively.

Consider first the Sun RPC Bind Lookup request. Suppose packet 206 corresponds to such a request sent from CLIENT 3 to SERVER 2. This packet contains important information that is used in building a signature according to an aspect of the invention. A source and destination network address occupy the first two fields of each packet, and according to the patterns in pattern database 308, the flow signature (shown as KEY1 230 in FIG. 2) will also contain these two fields, so the parser subsystem 301 will include these two fields in signature KEY 1 (230). Note that in FIG. 2, if an address identifies the client 106 (shown also as 202), the label used in the drawing is "$C_1$". If such address identifies the server 110 (shown also as server 204), the label used in the drawing is "$S_1$". The first two fields 214 and 215 in packet 206 are "$S_1$" and "$C_1$" because packet 206 is provided from the server 110 and is destined for the client 106. Suppose for this example, "$S_1$" is an address numerically less than address "$C_1$". A third field "$p^1$" 216 identifies the particular protocol being used, e.g., TCP, UDP, etc.

In packet 206, a fourth field 217 and a fifth field 218 are used to communicate port numbers that are used. The conversation direction determines where the port number field is. The diagonal pattern in field 217 is used to identify a source-port pattern, and the hash pattern in field 218 is used to identify the destination-port pattern. The order indicates the client-server message direction. A sixth field denoted "$i_1$" 219 is an element that is being requested by the client from the server. A seventh field denoted "$s_1a$" 220 is the service requested by the client from server 110. The following eighth field "QA" 221 (for question mark) indicates that the client 106 wants to know what to use to access application "$s_1a$". A tenth field "QP" 223 is used to indicate that the client wants the server to indicate what protocol to use for the particular application.

Packet 206 initiates the sequence of packet exchanges, e.g., a RPC Bind Lookup Request to SERVER 2. It follows a well-defined format, as do all the packets, and is transmitted to the server 110 on a well-known service connection identifier (port 111 indicating Sun RPC).

Packet 207 is the first sent in reply to the client 106 from the server. It is the RPC Bind Lookup Reply as a result of the request packet 206.

Packet 207 includes ten fields 224–233. The destination and source addresses are carried in fields 224 and 225, e.g., indicated "$C_1$" and "$S_1$", respectively. Notice the order is now reversed, since the client-server message direction is from the server 110 to the client 106. The protocol "$p^1$" is used as indicated in field 226. The request "$i^1$" is in field 229. Values have been filled in for the application port number, e.g., in field 233 and protocol "$p^2$" in field 233.

The flow signature and flow states built up as a result of this exchange are now described. When the packet monitor 300 sees the request packet 206 from the client, a first flow signature 210 is built in the parser subsystem 301 according to the pattern and extraction operations database 308. This signature 210 includes a destination and a source address 240 and 241. One aspect of the invention is that the flow keys are built consistently in a particular order no matter what the direction of conversation. Several mechanisms may be used to achieve this. In the particular embodiment, the numerically lower address is always placed before the numerically higher address. Such least to highest order is used to get the best spread of signatures and hashes for the lookup operations. In this case, therefore, since we assume "$S_1$"<"$C_1$", the order is address "$S_1$" followed by client address "$C_1$". The next field used to build the signature is a protocol field 242 extracted from packet 206's field 216, and thus is the protocol "$p^1$". The next field used for the signature is field 243, which contains the destination source port number shown as a crosshatched pattern from the field 218 of the packet 206. This pattern will be recognized in the payload of packets to derive how this packet or sequence of packets exists as a flow. In practice, these may be TCP port numbers, or a combination of TCP port numbers. In the case of the Sun RPC example, the crosshatch represents a set of port numbers of UDS for $p_1$ that will be used to recognize this flow (e.g., port 111). Port 111 indicates this is Sun RPC. Some applications, such as the Sun RPC Bind Lookups, are directly determinable ("known") at the parser level. So in this case, the signature KEY-1 points to a known application denoted "$a^1$" (Sun RPC Bind Lookup), and a next-state that the state processor should proceed to for more complex recognition jobs, denoted as state "$st_D$" is placed in the field 245 of the flow-entry.

When the Sun RPC Bind Lookup reply is acquired, a flow signature is again built by the parser. This flow signature is identical to KEY-1. Hence, when the signature enters the analyzer subsystem 303 from the parser subsystem 301, the complete flow-entry is obtained, and in this flow-entry indicates state "$st_D$". The operations for state "$st_D$" in the state processor instruction database 326 instructs the state processor to build and store a new flow signature, shown as KEY-2 (212) in FIG. 2. This flow signature built by the state processor also includes the destination and a source addresses 250 and 251, respectively, for server "$S_1$" followed by (the numerically higher address) client "$C_1$". A protocol field 252 defines the protocol to be used, e.g., "$p^2$" which is obtained from the reply packet. A field 253 contains a recognition pattern also obtained from the reply packet. In this case, the application is Sun RPC, and field 254 indicates this application "$a^2$". A next-state field 255 defines the next state that the state processor should proceed to for more complex recognition jobs, e.g., a state "$st^1$". In this particular example, this is a final state. Thus, KEY-2 may now be used to recognize packets that are in any way associated with the application "$a^2$". Two such packets 208 and 209 are shown, one in each direction. They use the particular application service requested in the original Bind Lookup Request, and each will be recognized because the signature KEY-2 will be built in each case.

The two flow signatures 210 and 212 always order the destination and source address fields with server "$S_1$" followed by client "$C_1$". Such values are automatically filled in when the addresses are first created in a particular flow signature. Preferably, large collections of flow signatures are kept in a lookup table in a least-to-highest order for the best spread of flow signatures and hashes.

Thereafter, the client and server exchange a number of packets, e.g., represented by request packet 208 and response packet 209. The client 106 sends packets 208 that have a destination and source address Sand $C_1$, in a pair of fields 260 and 261. A field 262 defines the protocol as "$p^2$", and a field 263 defines the destination port number.

Some network-server application recognition jobs are so simple that only a single state transition has to occur to be able to pinpoint the application that produced the packet. Others require a sequence of state transitions to occur in order to match a known and predefined climb from state-to-state.

Thus the flow signature for the recognition of application "$a^2$" is automatically set up by predefining what packet-exchange sequences occur for this example when a relatively simple Sun Microsystems Remote Procedure Call bind lookup request instruction executes. More complicated exchanges than this may generate more than two flow signatures and their corresponding states. Each recognition may involve setting up a complex state transition diagram to be traversed before a "final" resting state such as "$st_1$" in field 255 is reached. All these are used to build the final set of flow signatures for recognizing a particular application in the future.

The Cache Subsystem

Referring again to FIG. 11, the cache subsystem 1115 is connected to the lookup update engine (LUE) 1107, the state processor the state processor (SP) 1108 and the flow insertion/deletion engine (FIDE) 1110. The cache 1115 keeps a set of flow-entries of the flow-entry database stored in memory 1123, so is coupled to memory 1123 via the unified memory controller 1119. According to one aspect of the invention, these entries in the cache are those likely-to-be-accessed next.

It is desirable to maximize the hit rate in a cache system. Typical prior-art cache systems are used to expedite memory accesses to and from microprocessor systems. Various mechanisms are available in such prior art systems to predict the lookup such that the hit rate can be maximized. Prior art caches, for example, can use a lookahead mechanism to predict both instruction cache lookups and data cache lookups. Such lookahead mechanisms are not available for the packet monitoring application of cache subsystem 1115. When a new packet enters the monitor 300, the next cache access, for example from the LUE 1107, may be for a totally different flow than the last cache lookup, and there is no way ahead of time of knowing what flow the next packet will belong to.

One aspect of the present invention is a cache system that replaces a least recently used (LRU) flow-entry when a cache replacement is needed. Replacing least recently used flow-entries is preferred because it is likely that a packet following a recent packet will belong to the same flow. Thus, the signature of a new packet will likely match a recently used flow record. Conversely, it is not highly likely that a packet associated with the least recently used flow-entry will soon arrive.

Furthermore, after one of the engines that operate on flow-entries, for example the LUE 1107, completes an operation on a flow-entry, it is likely that the same or another engine will soon use the same flow-entry. Thus it is desirable to make sure that recently used entries remain in the cache.

A feature of the cache system of the present invention is that most recently used (MRU) flow-entries are kept in cache whenever possible. Since typically packets of the same flow arrive in bursts, and since MRU flow-entries are likely to be required by another engine in the analysis subsystem, maximizing likelihood of MRU flow-entries remaining in cache increases the likelihood of finding flow records in the cache, thus increasing the cache hit rate.

Yet another aspect of the present cache invention is that it includes an associative memory using a set of content addressable memory cells (CAMs). The CAM contains an address that in our implementation is the hash value associated with the corresponding flow-entry in a cache memory (e.g., a data RAM) comprising memory cells. In one embodiment, each memory cell is a page. Each CAM also includes a pointer to a cache memory page. Thus, the CAM contents include the address and the pointer to cache memory. As is conventional, each CAM cell includes a matching circuit having an input. The hash is presented to the CAM's matching circuit input, and if the hash matches the hash in the CAM, the a match output is asserted indicating there is a hit. The CAM pointer points to the page number (i.e., the address) in the cache memory of the flow-entry.

Each CAM also includes a cache address input, a cache pointer input, and a cache contents output for inputting and outputting the address part and pointer part of the CAM.

The particular embodiment cache memory stores flow-entries in pages of one bucket, i.e., that can store a single flow-entry. Thus, the pointer is the page number in the cache memory. In one version, each hash value corresponds to a bin of N flow-entries (e.g., 4 buckets in the preferred embodiment of this version). In another implementation, each hash value points to a single flow record, i.e., the bin and bucket sizes correspond. For simplicity, this second implementation is assumed when describing the cache 1115.

Furthermore, as is conventional, the match output signal is provided to a corresponding location in the cache memory so that a read or write operation may take place with the location in the cache memory pointed to be the CAM.

One aspect of the present invention achieves a combination of associatively and true LRU replacement policy. For this, the CAMs of cache system 1115 are organized in what we call a CAM stack (also CAM array) in an ordering, with a top CAM and a bottom CAM. The address and pointer output of each CAM starting from the top CAM is connected to the address and pointer input of the next cache up to the bottom.

In our implementation, a hash is used to address the cache. The hash is input to the CAM array, and any CAM that has an address that matches the input hash asserts its match output indicating a hit. When there is a cache hit, the contents of the CAM that produced the hit (including the address and pointer to cache memory) are put in the top CAM of the stack. The CAM contents (cache address, and cache memory pointer) of the CAMs above the CAM that produced are shifted down to fill the gap.

If there is a miss, any new flow record is put in the cache memory element pointed to by the bottom CAM. All CAM contents above the bottom are shifted down one, and then the new hash value and the pointer to cache memory of the new flow-entry are put in the top-most CAM of the CAM stack.

In this manner, the CAMs are ordered according to recentness of use, with the least recently used cache contents pointed to by the bottom CAM and the most recently used cache contents pointed to by the top CAM.

Furthermore, unlike a conventional CAM-based cache, there is no fixed relationship between the address in the CAM and what element of cache memory it points to. CAM's relationship to a page of cache memory changes over time. For example, at one instant, the fifth CAM in the stack can include a pointer to one particular page of cache memory, and some time later, that same fifth CAM can point to a different cache memory page.

In one embodiment, the CAM array includes 32 CAMs and the cache memory includes 32 memory cells (e.g., memory pages), one page pointed to by each CAM contents. Suppose the CAMs are numbered $CAM_0$, $CAM_1$, ..., $CAM_{31}$, respectively, with $CAM_0$ the top CAM in the array and $CAM_{31}$ the bottom CAM.

The CAM array is controlled by a CAM controller implemented as a state machine, and the cache memory is controlled by a cache memory controller which also is implemented as a state machine. The need for such controllers and how to implement them as state machines or otherwise would be clear to one skilled in the art from this description of operation. In order not to confuse these controllers with other controllers, for example, with the unified memory controller, the two controllers will be called the CAM state machine and the memory state machine, respectively.

Consider as an example, that the state of the cache is that it is full. Suppose furthermore that the contents of the CAM stack (the address and the pointer to the cache memory) and of the cache memory at each page number address of cache memory are as shown in the following table.

| CAM | Hash | Cache Point | Cache Addr. | Contents |
|---|---|---|---|---|
| $CAM_0$ | $hash_0$ | $page_0$ | $page_0$ | $entry_0$ |
| $CAM_1$ | $hash_1$ | $page_1$ | $page_1$ | $entry_1$ |
| $CAM_2$ | $hash_2$ | $page_2$ | $page_2$ | $entry_2$ |
| $CAM_3$ | $hash_3$ | $page_3$ | $page_3$ | $entry_3$ |
| $CAM_4$ | $hash_4$ | $page_4$ | $page_4$ | $entry_4$ |
| $CAM_5$ | $hash_5$ | $page_5$ | $page_5$ | $entry_5$ |
| $CAM_6$ | $hash_6$ | $page_6$ | $page_6$ | $entry_6$ |
| $CAM_7$ | $hash_7$ | $page_7$ | $page_7$ | $entry_7$ |
| ... | ... | ... | ... | ... |
| $CAM_{29}$ | $hash_{29}$ | $page_{29}$ | $page_{29}$ | $entry_{29}$ |
| $CAM_{30}$ | $hash_{30}$ | $page_{30}$ | $page_{30}$ | $entry_{30}$ |
| $CAM_{31}$ | $hash_{31}$ | $page_{31}$ | $page_{31}$ | $entry_{31}$ |

This says that $CAM_4$ contains and will match with the hash value $hash_4$, and a lookup with $hash_4$ will produce a match and the address $page_4$ in cache memory. Furthermore, $page_4$ in cache memory contains the flow-entry, $entry_4$, that in this notation is the flow-entry matching hash value $hash_4$. This table also indicates that $hash_0$ was more recently used than $hash_1$, $hash_5$ more recently than $hash_2$, and so forth, with $hash_{31}$ the least recently used hash value. Suppose further that the LUE 1107 obtains an entry from unified flow key buffer 1103 with a hash value $hash_{31}$. The LUE looks up the cache subsystem via the CAM array. $CAM_{31}$ gets a hit and returns the page number of the hit, i.e., $page_{31}$. The cache subsystem now indicates to the LUE 1007 that the supplied hash value produced a hit and provides a pointer to $page_{31}$ of the cache memory which contains the flow-entry corresponding to $hash_{31}$, i.e., $flow_{31}$. The LUE now retrieve the flow-entry $flow_{31}$ from the cache memory at address $page_{31}$. In the preferred embodiment, the lookup of the cache takes only one clock cycle.

The value $hash_{31}$ is the most recently used hash value. Therefore, in accordance with an aspect of the inventive cache system, the most recently used entry is put on top of the CAM stack. Thus $hash_{31}$ is put into $CAM_0$ (pointing to $page_{31}$). Furthermore, $hash_{30}$ is now the LRU hash value, so is moved to $CAM_{31}$. The next least recently used hash value, $hash_{29}$ is now moved to $CAM_{30}$, and so forth. Thus, all CAM contents are shifted one down after the MSU entry is put in the top CAM. In the preferred embodiment the shifting down on CAM entries takes one clock cycle. Thus, the lookup and the rearranging of the CAM array to maintain the ordering according to usage recentness. The following table shows the new contents of the CAM array and the (unchanged) contents of the cache memory.

| CAM | Hash | Cache Point | Cache Addr. | Contents |
|---|---|---|---|---|
| $CAM_0$ | $hash_{31}$ | $page_{31}$ | $page_0$ | $entry_0$ |
| $CAM_1$ | $hash_0$ | $page_0$ | $page_1$ | $entry_1$ |
| $CAM_2$ | $hash_1$ | $page_1$ | $page_2$ | $entry_2$ |
| $CAM_3$ | $hash_2$ | $page_2$ | $page_3$ | $entry_3$ |
| $CAM_4$ | $hash_3$ | $page_3$ | $page_4$ | $entry_4$ |
| $CAM_5$ | $hash_4$ | $page_4$ | $page_5$ | $entry_5$ |
| $CAM_6$ | $hash_5$ | $page_5$ | $page_6$ | $entry_6$ |
| $CAM_7$ | $hash_6$ | $page_6$ | $page_7$ | $entry_7$ |
| ... | ... | ... | ... | ... |
| $CAM_{29}$ | $hash_{28}$ | $page_{28}$ | $page_{29}$ | $entry_{29}$ |
| $CAM_{30}$ | $hash_{29}$ | $page_{29}$ | $page_{30}$ | $entry_{30}$ |
| $CAM_{31}$ | $hash_{30}$ | $page_{30}$ | $page_{31}$ | $entry_{31}$ |

To continue with the example, suppose that some time later, the LUE 1007 looks up hash value $hash_5$. This produces a hit in $CAM_6$ pointing to $page_5$ of the cache memory. Thus, in one clock cycle, the cache subsystem 1115 provides LUE 1007 with an indication of a hit and the pointer to the flow-entry in the cache memory. The most recent entry is $hash_5$, so $hash_5$ and cache memory address $page_6$ are entered into $CAM_0$. The contents of the remaining CAMs are all shifted down one up to and including the entry that contained $hash_5$. That is, $CAM_7$, $CAM_8$, ..., $CAM_{31}$ remain unchanged. The CAM array contents and unchanged cache memory contents are now as shown in the following table.

| CAM | Hash | Cache Point | Cache Addr. | Contents |
|---|---|---|---|---|
| $CAM_0$ | $hash_5$ | $page_5$ | $page_0$ | $entry_0$ |
| $CAM_1$ | $hash_{31}$ | $page_{31}$ | $page_1$ | $entry_1$ |
| $CAM_2$ | $hash_0$ | $page_0$ | $page_2$ | $entry_2$ |
| $CAM_3$ | $hash_1$ | $page_1$ | $page_3$ | $entry_3$ |
| $CAM_4$ | $hash_2$ | $page_2$ | $page_4$ | $entry_4$ |
| $CAM_5$ | $hash_3$ | $page_3$ | $page_5$ | $entry_5$ |
| $CAM_6$ | $hash_4$ | $page_4$ | $page_6$ | $entry_6$ |
| $CAM_7$ | $hash_6$ | $page_6$ | $page_7$ | $entry_7$ |
| ... | ... | ... | ... | ... |
| $CAM_{29}$ | $hash_{28}$ | $page_{28}$ | $page_{29}$ | $entry_{29}$ |
| $CAM_{30}$ | $hash_{29}$ | $page_{29}$ | $page_{30}$ | $entry_{30}$ |
| $CAM_{31}$ | $hash_{30}$ | $page_{30}$ | $page_{31}$ | $entry_{31}$ |

Thus in the case of cache hits, the CAM array always keeps used hash values in the order of recentness of use, with the most recently used hash value in the top CAM.

The operation of the cache subsystem when there is a cache hit will be described by continuing the example. Suppose there is a lookup (e.g., from LUE 1107) for hash value $hash_{43}$. The CAM array produces a miss that causes in a lookup using the hash in the external memory. The specific operation of our specific implementation is that the CAM state machine sends a GET message to the memory state machine that results in a memory lookup using the hash via the unified memory controller (UMC) 1119. However, other means of achieving a memory lookup when there is a miss in the CAM array would be clear to those in the art.

The lookup in the flow-entry database 324 (i.e., external memory) results in a hit or a miss. Suppose that the database 324 of flow-entries does not have an entry matching hash value $hash_{43}$. The memory state machine indicates the miss to the CAM state machine which then indicates the miss to the LUE 1007. Suppose, on the other hand that there is a flow-entry—$entry_{43}$—in database 324 matching hash value $hash_{43}$. In this case, the flow-entry is brought in to be loaded into the cache.

In accordance with another aspect of the invention, the bottom CAM entry $CAM_{31}$ always points to the LRU address in the cache memory. Thus, implementing a true LRU replacement policy includes flushing out the LRU cache memory entry and inserting a new entry into that LRU cache memory location pointed to by the bottom CAM. The CAM entry also is modified to reflect the new hash value of the entry in the pointed to cache memory element. Thus, hash value $hash_{43}$ is put in $CAM_{31}$ and flow-entry $entry_{43}$ is placed in the cache page pointed to by CAM 31. The CAM array and now changed cache memory contents are now

| CAM | Hash | Cache Point | Cache Addr. | Contents |
|---|---|---|---|---|
| $CAM_0$ | $hash_5$ | $page_5$ | $page_0$ | $entry_0$ |
| $CAM_1$ | $hash_{31}$ | $page_{31}$ | $page_1$ | $entry_1$ |
| $CAM_2$ | $hash_0$ | $page_0$ | $page_2$ | $entry_2$ |
| $CAM_3$ | $hash_1$ | $page_1$ | $page_3$ | $entry_3$ |
| $CAM_4$ | $hash_2$ | $page_2$ | $page_4$ | $entry_4$ |
| $CAM_5$ | $bash_3$ | $page_3$ | $page_5$ | $entry_5$ |
| $CAM_6$ | $hash_4$ | $page_4$ | $page_6$ | $entry_6$ |
| $CAM_7$ | $hash_6$ | $page_6$ | $page_7$ | $entry_7$ |
| ... | ... | ... | ... | ... |
| $CAM_{29}$ | $hash_{28}$ | $page_{28}$ | $page_{29}$ | $entry_{29}$ |
| $CAM_{30}$ | $hash_{29}$ | $page_{29}$ | $page_{30}$ | $entry_{43}$ |
| $CAM_{31}$ | $hash_{43}$ | $page_{30}$ | $page_{31}$ | $entry_{31}$ |

Note that the inserted entry is now the MRU flow-entry. So, the contents of $CAM_{31}$ are now moved to $CAM_0$ and the entries previously in the top 30 CAMs moved down so that once again, the bottom CAM points to the LRU cache memory page.

| CAM | Hash | Cache Point | Cache Addr. | Contents |
|---|---|---|---|---|
| $CAM_0$ | $hash_{43}$ | $page_{30}$ | $page_0$ | $entry_0$ |
| $CAM_1$ | $hash_5$ | $page_5$ | $page_1$ | $entry_1$ |
| $CAM_2$ | $hash_{31}$ | $page_{31}$ | $page_2$ | $entry_2$ |
| $CAM_3$ | $hash_0$ | $page_0$ | $page_3$ | $entry_3$ |
| $CAM_4$ | $hash_1$ | $page_1$ | $page_4$ | $entry_4$ |
| $CAM_5$ | $hash_2$ | $page_2$ | $page_5$ | $entry_5$ |
| $CAM_6$ | $hash_3$ | $page_3$ | $page_6$ | $entry_6$ |
| $CAM_7$ | $hash_4$ | $page_4$ | $page_7$ | $entry_7$ |
| ... | $hash_6$ | $page_6$ | ... | ... |
| $CAM_{29}$ | | | $page_{29}$ | $entry_{29}$ |
| $CAM_{30}$ | $hash_{28}$ | $page_{28}$ | $page_{30}$ | $entry_{43}$ |
| $CAM_{31}$ | $hash_{29}$ | $page_{29}$ | $page_{31}$ | $entry_{31}$ |

Note that the inserted entry is now the MRU flow-entry. So, the contents of $CAM_{31}$ are now moved to $CAM_0$ and the entries previously in the top 30 CAMs moved In addition to looking up entries of database 324 via the cache subsystem 1115 for retrieval of an existing flow-entry, the LUE, SP, or FIDE engines also may update the flow-entries via the cache. As such, there may be entries in the cache that are updated flow-entries. Until such updated entries have been written into the flow-entry database 324 in external memory, the flow-entries are called "dirty." As is common in cache systems, a mechanism is provided to indicate dirty entries in the cache. A dirty entry cannot, for example, be flushed out until the corresponding entry in the database 324 has been updated.

Suppose in the last example, that the entry in the cache was modified by the operation. That is, $hash_{43}$ is in MRU $CAM_0$, $CAM_0$ correctly points to $page_{30}$, but the information in $page_{30}$ of the cache, $entry_{43}$, does not correspond to $entry_{43}$ in database 324. That is, the contents of cache page $page_{30}$ is dirty. There is now a need to update the database 324. This is called backing up or cleaning the dirty entry.

As is common in cache systems, there is an indication provided that a cache memory entry is dirty using a dirty flag. In the preferred embodiment, there is a dirty flag for each word in cache memory.

Another aspect of the inventive cache system is cleaning cache memory contents according to the entry most likely to be first flushed out of the cache memory. In our LRU cache embodiment, the cleaning of the cache memory entries proceeds in the inverse order of recentness of use. Thus, LRU pages are cleaned first consistent with the least likelihood that these are the entries likely to be flushed first.

In our embodiment, the memory state machine, whenever it is idle, is programmed to scan the CAM array in reverse order of recentness, i.e., starting from the bottom of the CAM array, and look for dirty flags. Whenever a dirty flag is found, the cache memory contents are backed up to the database 324 in external memory.

Note that once a page of cache memory is cleaned, it is kept in the cache in case it is still needed. The page is only flushed when more cache memory pages are needed. The corresponding CAM also is not changed until a new cache memory page is needed. In this way, efficient lookups of all cache memory contents, including clean entries are still possible. Furthermore, whenever a cache memory entry is flushed, a check is first made to ensure the entry is clean. If the entry is dirty, it is backed up prior to flushing the entry.

The cache subsystem 1115 can service two read transfers at one time. If there are more than two read requests active at one time the Cache services them in a particular order as follows:

(1) LRU dirty write back. The cache writes back the least recently used cache memory entry if it is dirty so that there will always be a space for the fetching of cache misses.
(2) Lookup and update engine 1107.
(3) State processor 1108.
(4) Flow insertion and deletion engine 1110.
(5) Analyzer host interface and control 1118.
(6) Dirty write back from LRU −1 to MRU; when there is nothing else pending, the cache engine writes dirty entries back to external memory.

Figure 19:
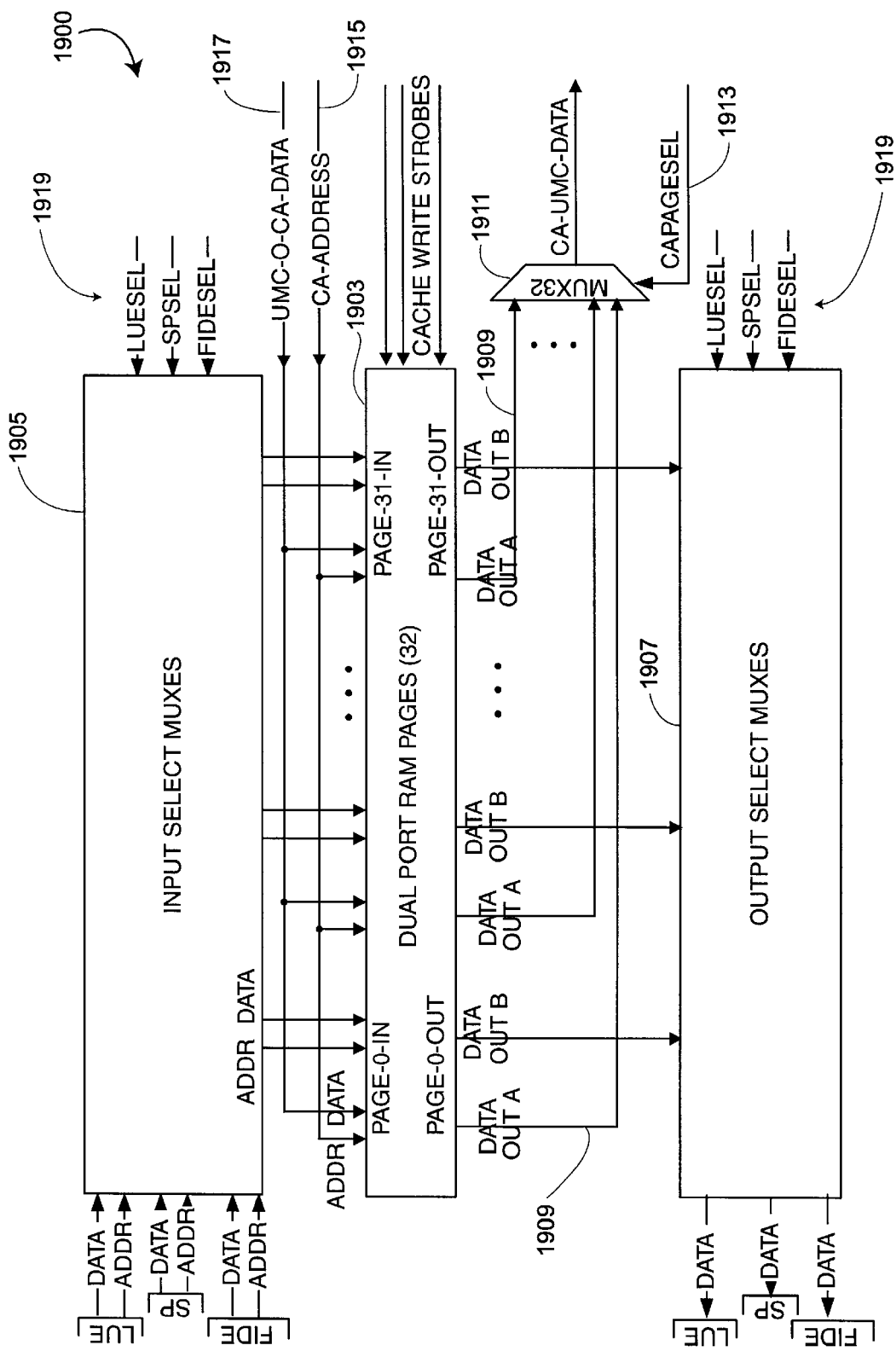
FIG. 19 is a block diagram of the cache memory part of the cache subsystem of the analyzer subsystem of FIG. 11.

FIG. 19 shows the cache memory component 1900 of the cache subsystem 1115. Cache memory subsystem 1900 includes a bank 1903 of dual ported memories for the pages of cache memory. In our preferred embodiment there are 32 pages. Each page of memory is dual ported. That is, it includes two sets of input ports each having address and data inputs, and two sets of output ports, one set of input and output ports are coupled to the unified memory controller (UMC) 1119 for writing to and reading from the cache memory from and into the external memory used for the flow-entry database 324. Which of the output lines 1909 is coupled to UMC 1119 is selected by a multiplexor 1911 using a cache page select signal 1913 from CAM memory subsystem part of cache system 1115. Updating cache memory from the database 324 uses a cache data signal 1917 from the UMC and a cache address signal 1915.

Looking up and updating data from and to the cache memory from the lookup/update engine (LUE) 1107, state processor (SP) 1108 or flow insertion/deletion engine (FIDE) 1110 uses the other input and output ports of the cache memory pages 1903. A bank of input selection multiplexors 1905 and a set of output selector multiplexors 1907 respectively select the input and output engine using a set of selection signals 1919.

Figure 20:
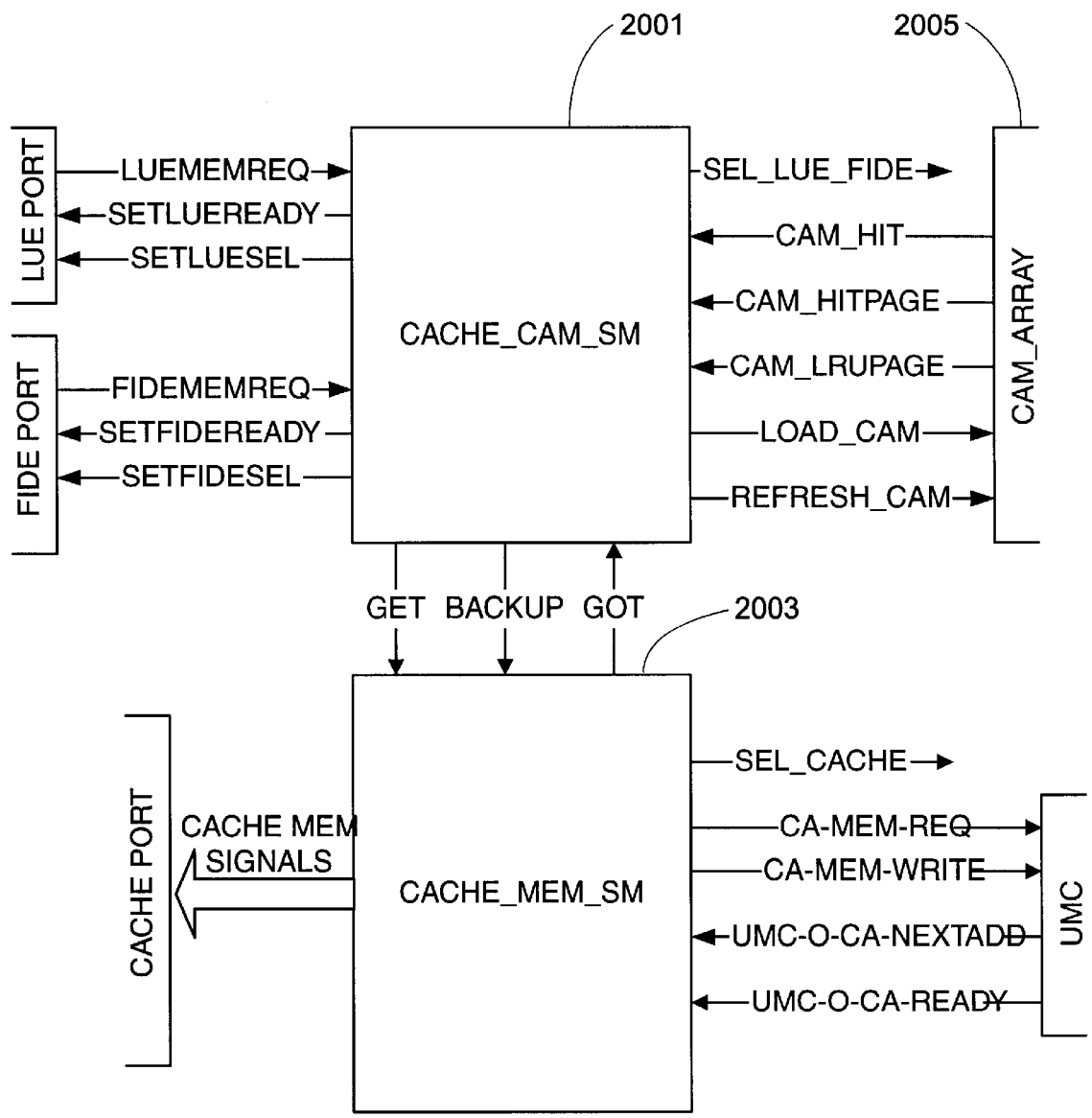
FIG. 20 is a block diagram of the cache memory controller and the cache CAM controller of the cache subsystem.

FIG. 20 shows the cache CAM state machine 2001 coupled to the CAM array 2005 and to the memory state machine 2003, together with some of the signals that pass between these elements. The signal names are self-explanatory, and how to implement these controllers as state machines or otherwise would be clear from the description herein above.

Figure 21:
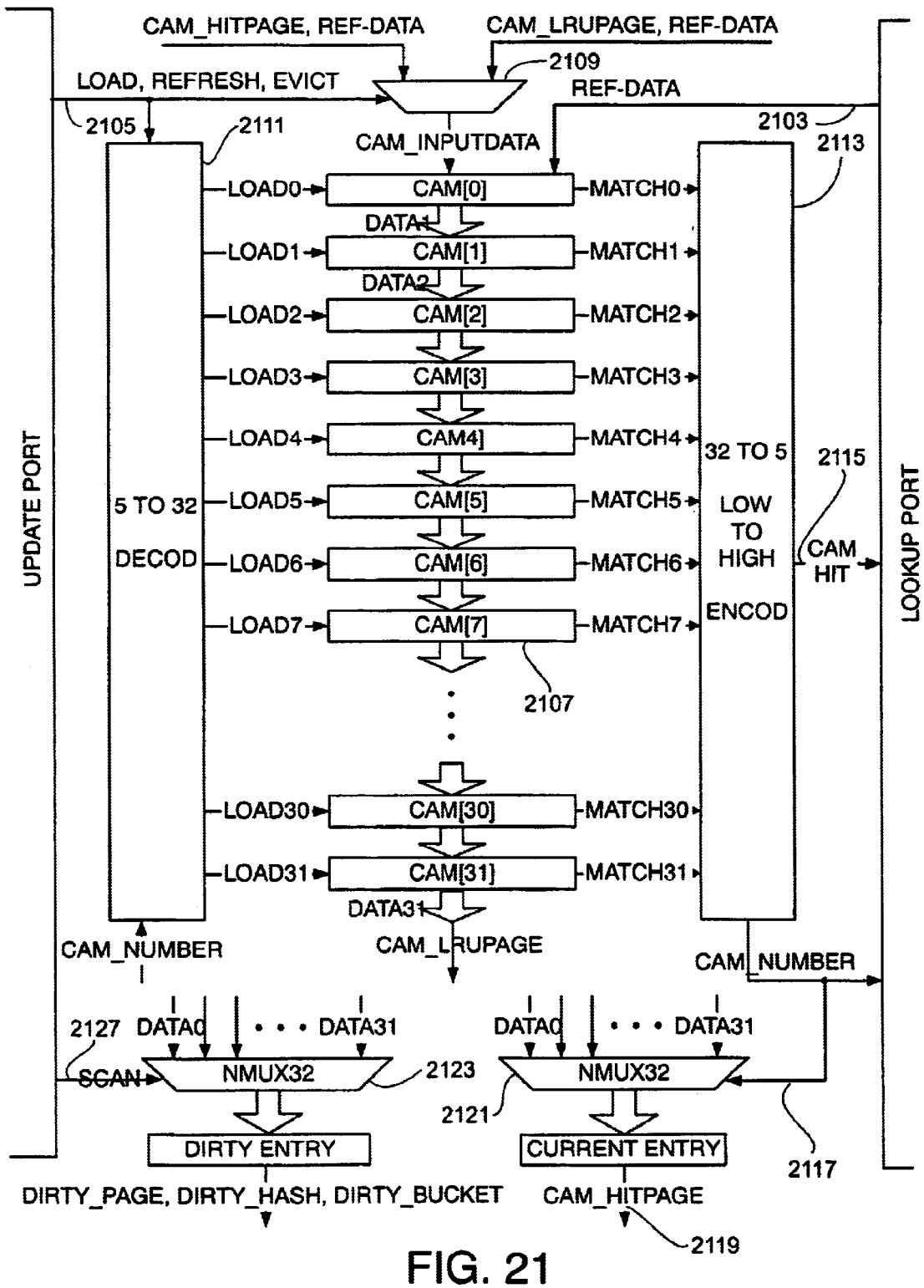
FIG. 21 is a block diagram of one implementation of the CAM array of the cache subsystem 1115.

While the above description of operation of the CAM array is sufficient for one skilled in the art to design such a CAM array, and many such designs are possible, FIG. 21 shows one such design. Referring to that figure, the CAM array 2005 comprises one CAM, e.g., CAM[7] (2107), per page of CAM memory. The lookup port or update port depend which of the LUE, SP or FIDE are accessing the cache subsystem. The input data for a lookup is typically the hash, and shown as REF-DATA 2103. Loading, updating or evicting the cache is achieved using the signal 2105 that both selects the CAM input data using a select multiplexor 2109, such data being the hit page or the LRU page (the bottom CAM in according to an aspect of the invention). Any loading is done via a 5 to 32 decoder 2111. The results of the CAM lookup for all the CAMs in the array is provided to a 32-5 low to high 32 to 5 encoder 2113 that outputs the hit 2115, and which CAM number 2117 produced the hit. The CAM hit page 2119 is an output of a MUX 2121 that has the CAM data of each CAM as input and an output selected by the signal 2117 of the CAM that produced the hit. Maintenance of dirty entries is carried out similarly from the update port that coupled to the CAM state machine 2001. A MUX 2123 has all CAMs' data input and a scan input 2127. The MUX 2123 produces the dirty data 2125.

Although the present invention has been described in terms of the presently preferred embodiments, it is to be understood that the disclosure is not to be interpreted as limiting. Various alterations and modifications will no doubt become apparent to those of ordinary skill in the art after having read the above disclosure. Accordingly, it is intended that the claims be interpreted as covering all alterations and modifications as fall within the true spirit and scope of the present invention.

What is claimed is:

1. A packet monitor for examining packet passing through a connection point on a computer network, each packets conforming to one or more protocols, the monitor comprising:

(a) a packet acquisition device coupled to the connection point and configured to receive packets passing through the connection point;

(b) a memory for storing a database comprising flow-entries for previously encountered conversational flows to which a received packet may belong, a conversational flow being an exchange of one or more packets in any direction as a result of an activity corresponding to the flow;

(c) a cache subsystem coupled to the flow-entry database memory providing for fast access of flow-entries from the flow-entry database;

(d) a lookup engine coupled to the packet acquisition device and to the cache subsystem and configured to lookup whether a received packet belongs to a flow-entry in the flow-entry database, to looking up being the cache subsystem; and (e) a state processor coupled to the lookup engine and to the flow-entry-database memory, the state processor being to perform any state operations specified for the state of the flow starting from the last encountered state of the flow in the case that the packet is from an existing flow, and to perform any state operations required for the initial state of the new flow in the case that the packet is from an existing flow.

2. A packet monitor according to claim 1, further comprising:
a parser subsystem coupled to the packet acquisition device and to the lookup engine such that the acquisition device is coupled to the lookup engine via the parser subsystem, the parser subsystem configured to extract identifying information from a received packet, wherein each flow-entry is identified by identifying information stored in the flow-entry, and wherein the cache lookup uses a function of the extracted identifying information.

3. A packet monitor according to claim 2, wherein the cache subsystem is an associative cache subsystem including one or more content addressable memory cells (CAMs).

4. A packet monitor according to claim 2, wherein the cache subsystem includes:
(i) a set of cache memory elements coupled to the flow-entry database memory, each cache memory element including an input port to input a flow-entry and configured to store a flow-entry of the flow-entry database;
(ii) a set of content addressable memory cells (CAMs) connected according to an order of connections from a top CAM to a bottom CAM, each CAM containing an address and a pointer to one of the cache memory elements, and including:
a matching circuit having an input such that the CAM asserts a match output when the input is the same as the address in the CAM cell, an asserted match output indicating a hit,
a CAM input configured to accept an address and a pointer, and
a CAM address output and a CAM pointer output;
(iii) a CAM controller coupled to the CAM set; and
(iv) a memory controller coupled to the CAM controller, to the cache memory set, and to the flow-entry memory,
wherein the matching circuit inputs of the CAM cells are coupled to the lookup engine such that that an input to the matching circuit inputs produces a match output in any CAM cell that contains an address equal to the input, and wherein the CAM controller is configured such that which cache memory element a particular CAM points to changes over time.

5. A packet monitor according to claim 4, wherein the CAM controller is configured such that the bottom CAM points to the least recently used cache memory element.

6. A packet monitor according to claim 5, wherein the address and pointer output of each CAM starting from the top CAM is coupled to the address and pointer input of the next CAM, the final next CAM being the bottom CAM, and wherein the CAM controller is configured such than when there is a cache hit, the address and pointer contents of the CAM that produced the hit are put in the top CAM of the stack, the address and pointer contents of the CAMs above the CAM that produced the asserted match output are shifted down, such that the CAMs are ordered according to recentness of use, with the least recently used cache memory element pointed to by the bottom CAM and the most recently used cache memory element pointed to by the top CAM.

7. A packet monitor for examining packet passing through a connection point on a computer network, each packets conforming to one or more protocols, the monitor comprising:
a packet acquisition device coupled to the connection point and configured to receive packets passing through the connection point;
an input buffer memory coupled to and configured to accept a packet from the packet acquisition device;
a parser subsystem coupled to the input buffer memory, the parsing subsystem configured to extract selected portions of the accepted packet and to output a parser record containing the selected portions;
a memory to storing a database of one or more flow-entries for any previously encountered conversational flows, each flow-entry identified by identifying information stored in the flow-entry;
a lookup engine coupled to the output of the parser subsystem and to the flow-entry memory and configured to lookup whether the particular packet whose parser record is output by the parser subsystem has a matching flow-entry, the looking up using at least some of the selected packet portions and determining if the packet is of an existing flow;
a cache subsystem coupled to and between the lookup engine and the flow-entry database memory providing for fast access of a set of likely-to-be-accessed flow-entries from the flow-entry database; and
a flow insertion engine coupled to the flow-entry memory and to the lookup engine and configured to create a flow-entry in the flow-entry database, the flow-entry including identifying information for future packets to be identified with the new flow-entry,
the lookup engine configured such that if the packet is of an existing flow, the monitor classifies the packet as belonging to the found existing flow; and if the packet is of a new flow, the flow insertion engine stores a new flow-entry for the new flow in the flow-entry database, including identifying information for future packets to be identified with the new flow-entry,
wherein the operation of the parser subsystem depends on one or more of the protocols to which the packet conforms.

8. A monitor according to claim 7, wherein the lookup engine updates the flow-entry of an existing flow in the case that the lookup is successful.

9. A monitor according to claim 7, further including a mechanism for building a hash from the selected portions, wherein the hash is included in the input for a particular packet to the lookup engine, and wherein the hash is used by the lookup engine to search the flow-entry database.

10. A monitor according to claim 7, further including a memory containing a database of parsing/extraction operations, the parsing/extraction database memory coupled to the parser subsystem, wherein the parsing/extraction operations are according to one or more parsing/extraction operations looked up from the parsing/extraction database.

11. A monitor according to claim 10, wherein the database of parsing/extraction operations includes information describing how to determine a set of one or more protocol dependent extraction operations from data in the packet that indicate a protocol used in the packet.

12. A method according to claim 7, further including a state processor coupled to the lookup engine and to the flow-entry-database memory, and configured to perform any state operations specified for the state of the flow starting from the last encountered state of the flow in the case that the packet is from an existing flow, and to perform any state operations required for the initial state of the new flow in the case that the packet is from an existing flow.

13. A method according to claim 12, wherein the set of possible state operations that the state processor is configured to perform includes searching for one or more patterns in the packet portions.

14. A monitor according to claim 12, wherein the state processor is programmable, the monitor further including a state patterns/operations memory coupled to the state processor, the state operations memory configured to store a database of protocol dependent state patterns/operations.

15. A monitor according to claim 12, wherein the state operations include updating the flow-entry, including identifying information for future packets to be identified with the flow-entry.

16. A method of examining packets passing through a connection point on a computer network, each packets conforming to one or more protocols, the method comprising:

(a) receiving a packet from a packet acquisition device;

(b) performing one or more parsing/extraction operations on the packet to create a parser record comprising a function of selected portions of the packet;

(c) looking up a flow-entry database comprising none or more flow-entries for previously encountered conversational flows, the looking up using at least some of the selected packet portions and determining if the packet is of an existing flow, the lookup being via a cache;

(d) if the packet is of an existing flow, classifying the packet as belonging to the found existing flow; and (e) if the packet is of a new flow, storing a new flow-entry for the new flow in the flow-entry database, including identifying information for future packets to be identified with the new flow-entry, wherein the parsing/extraction operations depend on one or more of the protocols to which the packet conforms.

17. A method according to claim 16, wherein classifying the packet as belonging to the found existing flow includes updating the flow-entry of the existing flow.

18. A method according to claim 16, wherein the function of the selected portions of the packet forms a signature that includes the selected packet portions and that can identify future packets, wherein the lookup operation uses the signature and wherein the identifying information stored in the new or updated flow-entry is a signature for identifying future packets.

19. A method according to claim 16, wherein the looking up of the flow-entry database uses a hash of the selected packet portions.

20. A method according to claim 16, wherein step (d) includes if the packet is of an existing flow, obtaining the last encountered state of the flow and performing any state operations specified for the state of the flow starting from the last encountered state of the flow; and wherein step (e) includes if the packet is of a new flow, performing any state operations required for the initial state of the new flow.

* * * * *

UNITED STATES PATENT AND TRADEMARK OFFICE
CERTIFICATE OF CORRECTION

PATENT NO. : 6,771,646 B1
DATED : August 3, 2004
INVENTOR(S) : Sarkissian et al.

It is certified that error appears in the above-identified patent and that said Letters Patent is hereby corrected as shown below:

Column 4,
Line 38, please change "part of the cache subsystem of the analyzer subsystem" to -- part of the cache subsystem 1115 of the analyzer subsystem --.

Column 5,
Line 28, please change "tha provides a framework" to -- that provides a framework --.
Line 30, please change "for understanding the functionaly" to -- understanding the functionality --.
Line 47, please change "may use a layerd model" to -- may use a layered model --.

Column 6,
Line 58, please change "buut that" to -- but that --.

Column 14,
Line 3, please change "or the or all the lookup tables for the is PRD" to -- "or all the lookup tables for the PRD --.

Column 15,
Line 10, please change "described in FIG. 6 FIG. 6 is a flow chart" to -- described in FIG. 6.
FIG. 6 is a flow chart --.

Column 28,
Line 34, please change "denoted "$i_1$" 219" to -- denoted "$i^1$" 219 --.

Column 29,
Line 16, please change "UDS for $p_1$ that" to -- UDS for $p^1$ that --.
Line 61, please change "and source address Sand $C_1$," to -- and source address $S_1$ and $C_1$, --.

Column 36,
Lines 39-41, please change "A packet monitor for examining packet passing through a connection point on a computer network, each packets conforming to" to -- A packet monitor for examining packets passing through a connection point on a computer network, each packet conforming to --.

UNITED STATES PATENT AND TRADEMARK OFFICE
CERTIFICATE OF CORRECTION

PATENT NO. : 6,771,646 B1
DATED : August 3, 2004
INVENTOR(S) : Sarkissian et al.

It is certified that error appears in the above-identified patent and that said Letters Patent is hereby corrected as shown below:

Column 37,
Lines 61-63, please change "A packet monitor for examining packet passing through a connection point on a computer network, each packets conforming to" to -- A packet monitor for examining packets passing through a connection point on a computer network, each packet conforming to --.

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,771,646 B1 Page 1 of 1
DATED : August 3, 2004
INVENTOR(S) : Sarkissian et al.

It is certified that error appears in the above-identified patent and that said Letters Patent is hereby corrected as shown below:

Column 37,
Line 54, kindly change "stack," to -- set, --.

Column 38,
Lines 56 and 64, kindly change "A method" to -- A monitor --.

Signed and Sealed this

Sixteenth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,771,646 B1
APPLICATION NO. : 09/608266
DATED : August 3, 2004
INVENTOR(S) : Haig A. Sarkissian and Russell S. Dietz It is certified that error appears in the above-identified patent and that said Letters Patent is hereby corrected as shown below:

IN THE CLAIMS:

Column 36, lines 58 and 59, claim 1, change "to looking up being the cache subsystem" to --the looking up being via the cache subsystem--.

Column 36, lines 65, 66 and 67, claim 1, change "perform any state operations required for the initial state of the new flow in the case that the packet is from an existing flow" to --perform any state operations required for the initial state of the new flow in the case that the packet is not from an existing flow--.

Column 38, line 7, claim 7, change "to storing" to --for storing--.

Signed and Sealed this
Fifteenth Day of October, 2013

Teresa Stanek Rea
*Deputy Director of the United States Patent and Trademark Office*

UNITED STATES PATENT AND TRADEMARK OFFICE
Certificate

Patent No. 6,771,646 B1                                                                                                                                Patented: August 3, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Haig A. Sarkissian, Conwall on Hudson, NY (US); Russell S. Dietz, San Jose, CA (US); and William H. Bares, San Jose, CA (US).

Signed and Sealed this Twenty-eighth Day of October 2014.

<div align="right">
ROBERTO VELEZ<br>
<i>Supervisory Patent Examiner</i><br>
Art Unit 2662<br>
Technology Center 2600
</div>

UNITED STATES PATENT AND TRADEMARK OFFICE
Certificate

Patent No. 6,771,646 B1            Patented: August 3, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Haig A. Sarkissian, San Antonio, TX (US); Russell S. Dietz, San Jose, CA (US); and William H. Bares, San Jose, CA (US).

Signed and Sealed this Eleventh Day of November 2014.

ROBERTO VELEZ
*Supervisory Patent Examiner*
Art Unit 2662
Technology Center 2600